(12) United States Patent
Drysdale et al.

(10) Patent No.: US 10,310,897 B2
(45) Date of Patent: Jun. 4, 2019

(54) HARDWARE ACCELERATORS AND METHODS FOR OFFLOAD OPERATIONS

(71) Applicant: Intel Corporation, Santa Clara, CA (US)

(72) Inventors: Tracy Garrett Drysdale, Paradise Valley, AZ (US); Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 15/282,372

(22) Filed: Sep. 30, 2016

(65) Prior Publication Data
US 2018/0095750 A1  Apr. 5, 2018

(51) Int. Cl.
*G06F 9/50* (2006.01)

(52) U.S. Cl.
CPC .............. *G06F 9/50* (2013.01); *G06F 9/5044* (2013.01)

(58) Field of Classification Search
CPC .................................................. G06F 9/3005
See application file for complete search history.

(56) References Cited

U.S. PATENT DOCUMENTS 5,606,665 A  2/1997 Yang et al.
6,490,669 B1 12/2002 Yabe
9,304,920 B2 * 4/2016 Munoz ............... G06F 12/084
2004/0139284 A1 * 7/2004 Clayton ............... G06F 9/5016
                                                    711/147
2007/0157211 A1 * 7/2007 Wang ................ G06F 9/30181
                                                    719/313

(Continued)

FOREIGN PATENT DOCUMENTS

WO    2012009150 A2    1/2012

OTHER PUBLICATIONS

International Search Report and Written Opinion for Application No. PCT/US2016/063208, dated Mar. 6, 2017, 10 pages.

(Continued)

*Primary Examiner* — Andrew Caldwell
*Assistant Examiner* — Michael J Metzger
(74) *Attorney, Agent, or Firm* — Nicholson De Vos Webster & Elliott LLP

(57) ABSTRACT

Methods and apparatuses relating to offload operations are described. In one embodiment, a hardware processor includes a core to execute a thread and offload an operation; and a first and second hardware accelerator to execute the operation, wherein the first and second hardware accelerator are coupled to shared buffers to store output data from the first hardware accelerator and provide the output data as input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer.

21 Claims, 19 Drawing Sheets

(56) References Cited

U.S. PATENT DOCUMENTS

| | | |
|---|---|---|
| 2008/0244118 A1* | 10/2008 | Accapadi .............. G06F 12/023 |
| | | 710/56 |
| 2008/0244126 A1 | 10/2008 | Hundley |
| 2009/0234989 A1 | 9/2009 | Fischer |
| 2011/0145514 A1* | 6/2011 | Lee ......................... G06F 9/544 |
| | | 711/147 |
| 2011/0283061 A1 | 11/2011 | Reddy |
| 2011/0320777 A1 | 12/2011 | Nemiroff et al. |
| 2013/0138918 A1 | 5/2013 | Muff et al. |
| 2014/0244944 A1* | 8/2014 | Mortier ................... G06F 9/544 |
| | | 711/147 |
| 2015/0046678 A1* | 2/2015 | Moloney ................ G09G 5/397 |
| | | 712/29 |
| 2015/0058495 A1 | 2/2015 | Droege et al. |
| 2015/0186268 A1 | 7/2015 | Asaad et al. |
| 2015/0301975 A1 | 10/2015 | Garg et al. |
| 2016/0132329 A1 | 5/2016 | Gupte et al. |

OTHER PUBLICATIONS

International Search Report and Written Opinion on Patentability for Application No. PCT/US2017/049407 dated Dec. 11, 2017, 11 pages.

Non-Final Office Action from U.S. Appl. No. 14/975,847, dated Nov. 3, 2017, 19 pages.

Notice of Allowance from U.S. Appl. No. 14/975,847, dated Apr. 20, 2018, 11 pages.

Notice of Allowance from U.S. Appl. No. 14/975,847, dated Sep. 14, 2018, 14 pages.

\* cited by examiner

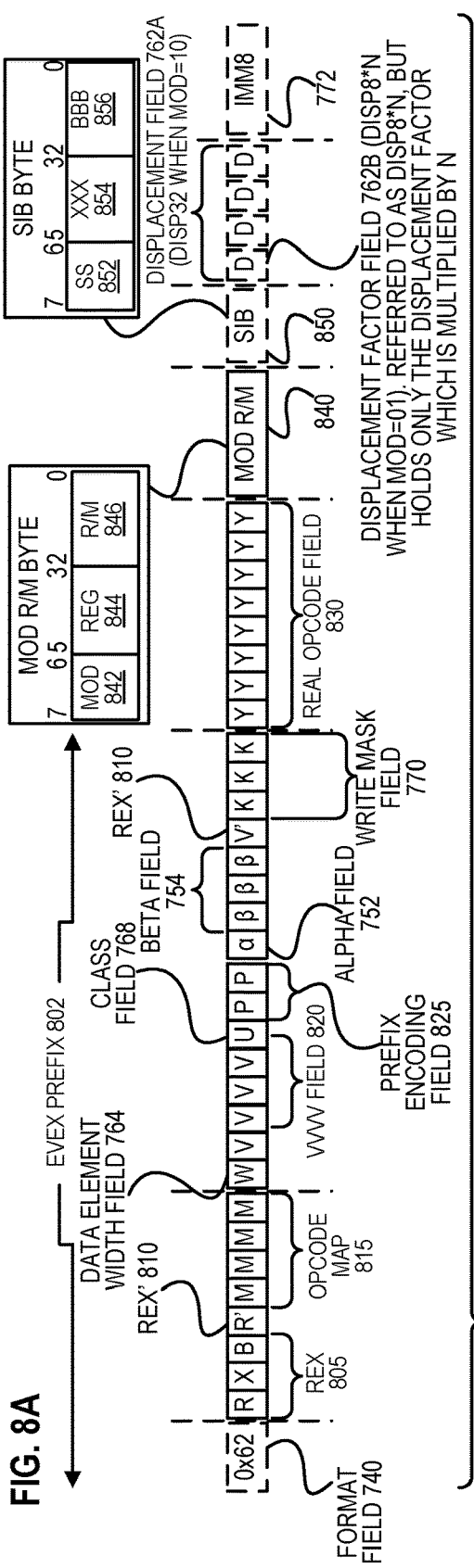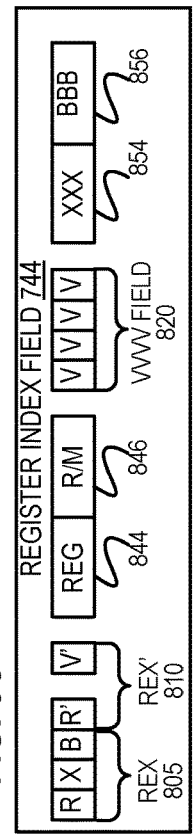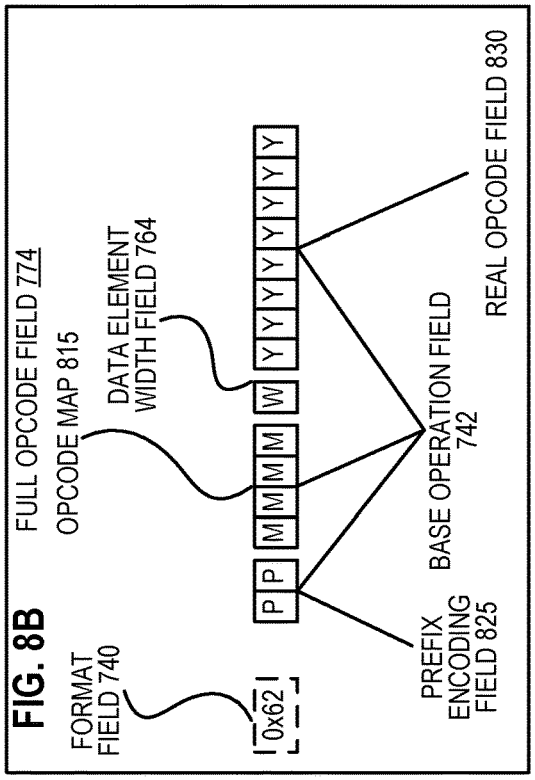

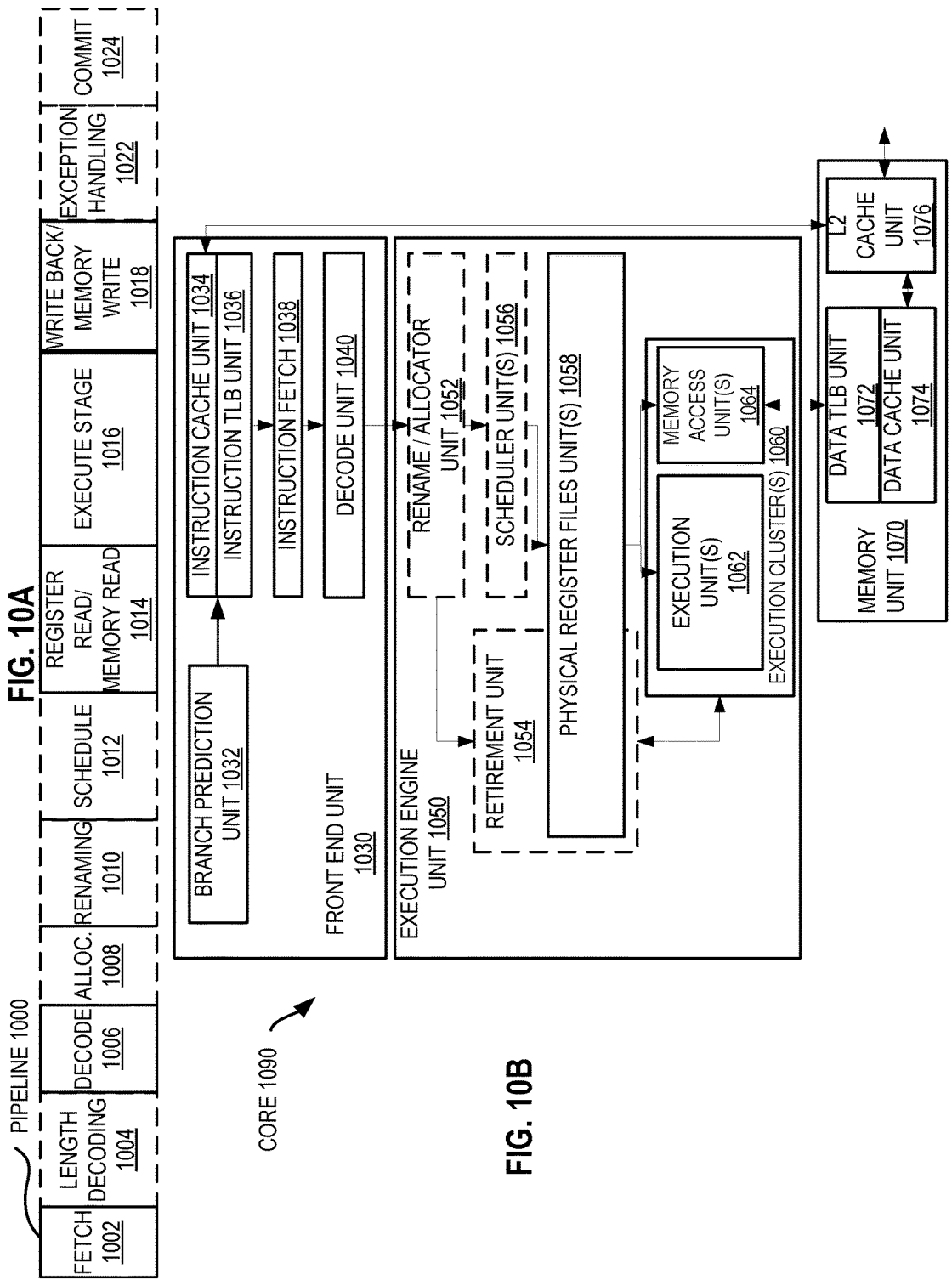

HARDWARE ACCELERATORS AND METHODS FOR OFFLOAD OPERATIONS

TECHNICAL FIELD

The disclosure relates generally to electronics, and, more specifically, an embodiment of the disclosure relates to hardware accelerators to perform offload operations.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8A is a block diagram illustrating fields for the generic vector friendly instruction formats in FIGS. 7A and 7B according to embodiments of the disclosure.

FIG. 8B is a block diagram illustrating the fields of the specific vector friendly instruction format in FIG. 8A that make up a full opcode field according to one embodiment of the disclosure.

FIG. 8C is a block diagram illustrating the fields of the specific vector friendly instruction format in FIG. 8A that make up a register index field according to one embodiment of the disclosure.

FIG. 10A is a block diagram illustrating both an exemplary in-order pipeline and an exemplary register renaming, out-of-order issue/execution pipeline according to embodiments of the disclosure.

FIG. 10B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
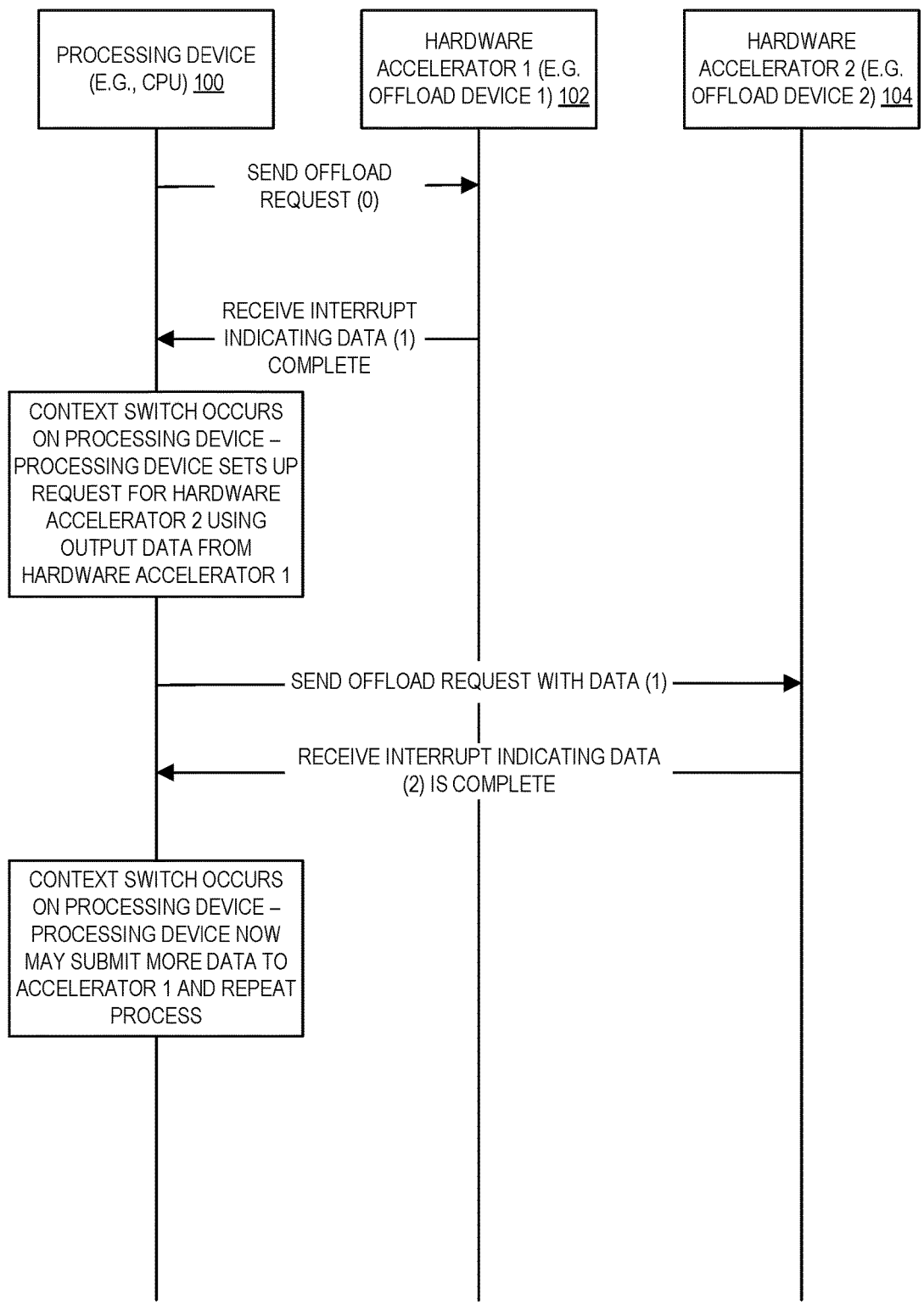
FIG. 1 illustrates a hardware processing device and hardware accelerators according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to a plurality of (e.g., on die) accelerators (e.g., offload engines) to perform one or more (e.g., offloaded) operations, for example, instead of those operations being performed only on the processor. In one embodiment, a processor (e.g., central processing unit (CPU)) includes (e.g., on die) accelerators (e.g., offload engines) to perform one or more operations, for example, instead of those operations being performed only on the processor. Certain embodiments herein provide for a high throughput scalable accelerator to accelerator communication mechanism.

Two non-limiting examples of operations are a compression operation and a decompression operation. A compression operation may refer to encoding information using fewer bits than the original representation. A decompression operation may refer to decoding the compressed information back into the original representation. A compression operation may compress data from a first format to a compressed, second format. A decompression operation may decompress data from a compressed, first format to an uncompressed, second format. A compression operation may be performed according to an (e.g., compression) algorithm. A decompression operation may be performed according to an (e.g., decompression) algorithm.

Certain embodiments of accelerator offload mechanisms do not support device to device communications. Instead, certain embodiments of accelerator (e.g., offload devices) interface only with a processor (e.g., CPU). This may result in several issues that become difficult to deal with when attempting to perform device to device direct communication. For example, the accelerators (e.g., offload devices) themselves may not support chaining or inlining to other devices. Certain accelerators may utilize a workload descriptor model to specify work. In one embodiment, one issue is there may be no single way that devices communicate with each other, nor may there be a common mechanism for initiating requests to devices, nor a common method for queueing requests. Certain mechanisms may be different between devices. From a software point of view, and the processor (e.g., CPU) to device and device to processor (e.g., CPU) interaction point of view, the control flow, data flow, and error handling may all be tied together in the work descriptor mechanism for many accelerators.

FIG. 1 illustrates a hardware processing device 100 and hardware accelerators (102, 104) according to embodiments of the disclosure. One accelerator offload mechanism includes writing a work descriptor structure (e.g., 256 bytes in some cases) to a work queue and then making an accelerator (e.g., accelerator 102) aware of the new request by writing a device location bumping a tail pointer to include the new request(s). In one embodiment, the work descriptor contains (e.g., all) the information on what the job is and (e.g., all) pointers to the data. This model may be problematic for device to device (e.g., chaining) implementations for several reasons enumerated below, e.g., and assume a flow of a processor (e.g., CPU) sending data to device 1 which sends data to device 2 which returns result to CPU (e.g., as shown in FIG. 1):

(1) The work descriptor (Wkdesc) model may require device 1 to be able to fill data fields in to a work descriptor for device 2. This may complicate device design for devices not designed to write work descriptors. In one embodiment, e.g., for general purpose chaining, a device is to be able to correctly write data to any other devices' work descriptor structure. Because additional (e.g., new) devices may be designed or interfaces modified, this means that in one embodiment the software driver for device 1 is to tell device 1 where to write information into the work descriptor being sent to device 2. It may also be problematic in that if (e.g., the type of) device 2 did not exist when the software driver for device 1 was written, then it may be that a software update is necessary to make device 1 capable of communicating with device 2, e.g., creating substantial software dependencies across drivers and devices that are impractical and creating many validation concerns.

(2) Embodiments of accelerators (e.g., offload devices) may use different queuing methods. In one embodiment, the queuing methods rely on writing complete work descriptors to shared queues where the processor (e.g., CPU) is to acquire critical section access, e.g., to prevent collisions among updating devices (e.g., cores) when updating the queues. This may be problematic when a device that does not have the capability to acquire a critical section is to ensure exclusive access for submission of a request. For example, it may become necessary to allocate a queue for each submitting device with no capability to share the queue. This may cause a scalability issue when the device is to be designed with sufficient physical queues to support the number of submitters, e.g., imposing a large design burden and the potential for a pre-selected number of queues to be insufficient in the future.

(3) Embodiment of accelerators may use different notification mechanisms like doorbells, and in addition, the data written to these doorbells may be different. For example, the data written that causes the doorbell may be related to the queue itself. The software and hardware issues of how one device is to know what to write to another device to signal a job submission may become unwieldy, e.g., when each of multiple devices has a different submission mechanism. The software complexities of trying to chain to accelerators (e.g., offload devices) may be complex and result in essentially having to write custom driver software to support such chaining.

Certain embodiments herein remove one or more of these issues and/or simplify the software and hardware design to accomplish chaining. Certain embodiments herein eliminate the need for custom software, e.g., chaining is designed into the hardware device (e.g., and driver) as a common capability with a defined solution. Certain embodiments herein allow any device (e.g., accelerator) to submit work to any other device. In one embodiment, an accelerator may perform a compression operation (e.g., thread) and/or decompression operation (e.g., thread), for example, in response to a request to and/or for a processor (e.g., a central processing unit (CPU)) to perform that operation. An accelerator may couple to (e.g., on die with an accelerator or off die) one or more buffers to store data, e.g., the input data and/or the output data. In one embodiment, an accelerator couples to an input buffer to load input therefrom and an output buffer to store output thereon. A processor may execute an instruction to offload an operation or operations (e.g., an instruction, a thread of instructions, or other work) to an accelerator.

Certain embodiments herein provide a highly scalable interface to enables accelerators (e.g., offload devices) to queue requests from one device to another, for example, with no processor (e.g., CPU) involvement in the individual requests or data transfers. Certain embodiments herein enable effective and efficient device (e.g., accelerator) to device (e.g., accelerator) communication and data passing, for example, for the chaining of devices. Certain embodiments herein enables device to device communication while reducing or eliminating the need for application software or driver software to have information about the work submission process for any other device, or even what the next device may be doing with the data. Certain embodiments herein allow devices to directly pass data without processor (e.g., CPU) involvement, for example, in contrast to having a processor (e.g., CPU or core) manage each offload event, for example, where a processor (e.g., CPU) is to be interrupted every time data is complete. For example, certain embodiments herein are in contrast to two (or more) devices returning data back to the processor (e.g., CPU) for each data return, e.g., which increase the context switch rate, allow non-productive code execution to get back through the operating system (OS) to the user thread, and/or increases last level cache (LLC) misses. All of these may contribute to longer compute latency in comparison to certain embodiments herein.

Additionally or alternatively, certain embodiments herein may be applied to input/output (I/O) devices. I/O devices supporting embodiments of the interface herein may receive data directly from an (e.g., accelerator) device and then perform the necessary I/O. Passing data directly from one device to an I/O channel may generally be referred to as "inlining" or "inline processing". This is in contrast to look aside processing where the processor (e.g., CPU) hands off data and later picks up the result. Certain embodiments herein greatly simplify the software problem around chaining and the complexities of chaining devices. Hardware accelerator devices and I/O devices according to embodiments herein may have certain features implemented to do so. Certain embodiments herein enable the communication of information directly between accelerator devices residing in a plurality (e.g., two) different processes or processors and/or a plurality (e.g., two) different virtual machines.

Certain embodiments herein allow devices (e.g., accelerators) to communicate directly to each other and/or to I/O devices on the platform, for example, without processor (e.g., CPU) involvement, e.g., to free processor (e.g., CPU) cycles to do high value processing which accelerators cannot do. Certain embodiments herein provide for higher performance and higher efficiency (perf/watt). Certain embodiments herein simplify the software model around these capabilities. Certain embodiments herein of accelerators and/or I/O devices include, but are not limited to, compression, machine learning (e.g., neural networks), cryptography, I/O fabrics, storage controllers, network interfaces, graphics, servers, etc.

Figure 2A:
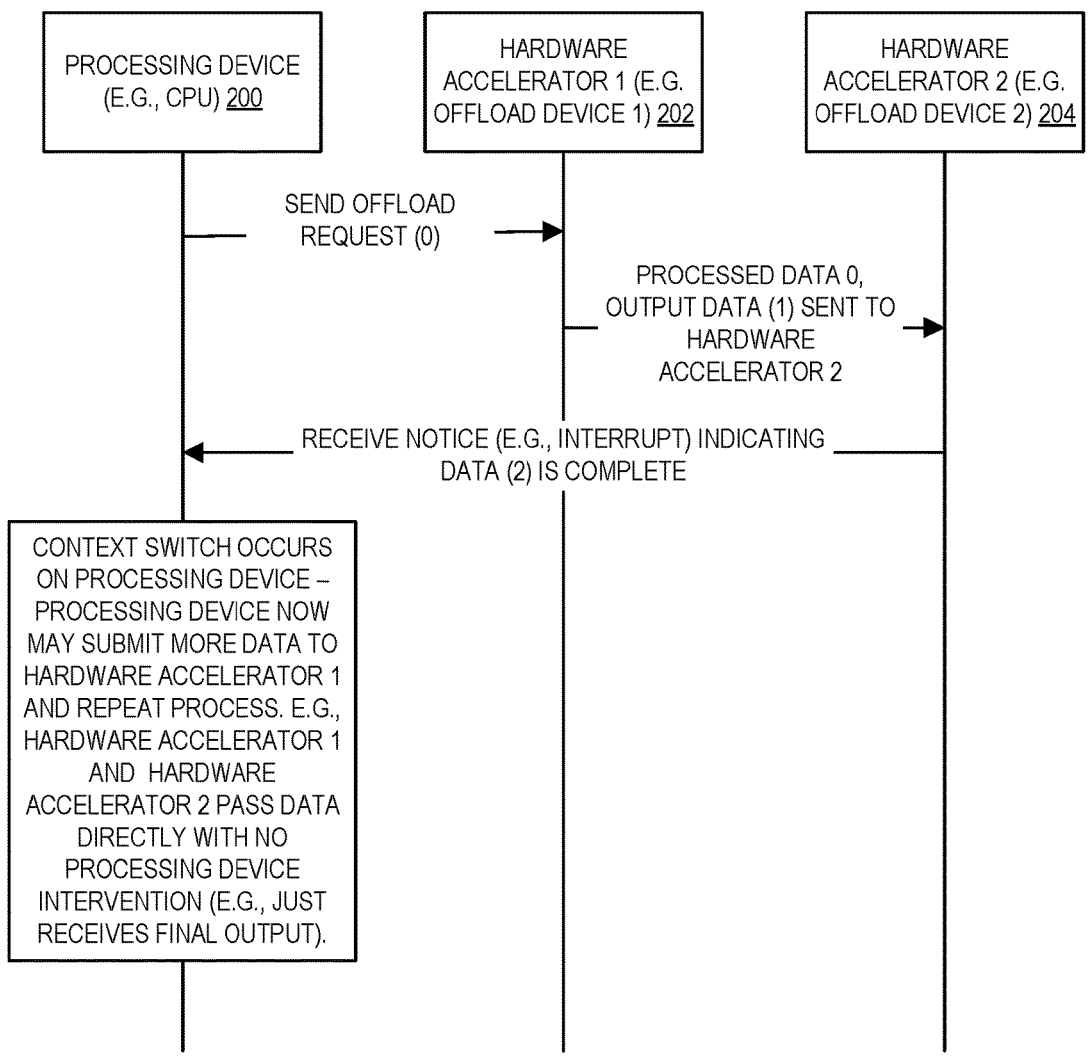
FIGS. 2A-2B illustrate a hardware processing device and hardware accelerators according to embodiments of the disclosure.
Figure 2B:
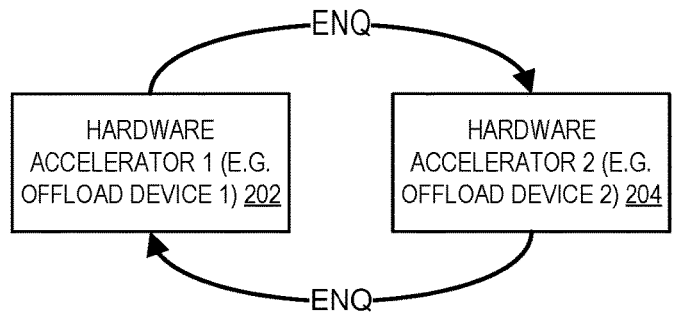

FIGS. 2A-2B illustrate a hardware processing device 200 and hardware accelerators (202, 204) according to embodiments of the disclosure. In contrast to FIG. 1, hardware accelerators (202, 204) may pass data directly between themselves, e.g., with no intervention from hardware processing device 200. In one embodiment, the device (e.g., accelerator) job control and job specification and initialization are separated logically and physically from the communication channel interface between devices. In certain embodiments, this communication channel between devices may (e.g., only) then be used to carry information about the availability of data and data buffers to be used by the devices. This data transmission is mechanism may be defined to be the same across (e.g., all) devices. For example, in an embodiment where the data transmitted between devices is limited in scope and/or because the data transmission is common across the (e.g., all) devices using this mechanism, it relieves the device of having information about where the data is coming from or going to, e.g., only that it now has data to work on or to provide to another device. The specifics of what is to be performed by the next device may be provided with a Job Context Pointer (Ptr) that is (e.g., only) meaningful to the receiving device, for example, that allows the receiving device to determine what to do with the data. In one embodiment, the Job Context Pointer is setup at initialization time when the channel is configured. Certain embodiments herein utilize an encode command (e.g., command packet) operation (e.g., ENQ) or other mechanism) to provide the transport mechanism. In one embodiment, the use of ENQ further allows multiple submitters to one accelerator port. For example, in FIG. 2B, an encode signal (e.g., command) may be sent from accelerator 202 to accelerator 204 (e.g., to indicate that output data generated by accelerator 202 is ready to be inputted into or processed on by accelerator 204) and/or may be sent from accelerator 204 to accelerator 202 (e.g., to indicate that accelerator 204 has processed the data from accelerator 202 and is ready for more input data from accelerator 202).

Certain embodiments herein provide one or more of the following features: provides common method for communication between devices, e.g., send data from one device to any other device without prior information (e.g., knowledge) of that device or what it does; separates control transport from data transport, provides communication channels (e.g., where processor or CPU configures channels) (e.g., devices (including CPU, accelerators, and/or I/O devices) send data on channels using minimum amount of information to specify context and operation), and separates error handling from data flow on communication channels. Certain embodiments herein provide for one or more of the following benefits: device to device (D2D) communications reduce OS traversal costs, significant context switch (CS) rate reduction, last level cache (LLC) misses per instruction (MPI) reduction, processor or CPU utilization reduction, latency reduction of total compute chain, performance per unit of power (e.g., Watt) increases, increases system throughput capability, increases flexibility and simplified device programming model, memory bandwidth reduction (e.g., due to the ability to use smaller buffers and finer grained communication between two devices than between a processor (e.g., CPU or core) and a device, and support inlining where an accelerator device communicates directly to an I/O device. For this disclosure, device may refer to either an offload accelerator device or an I/O device.

Certain embodiments herein provide for (e.g., general purpose) device to device chaining between (e.g., unrelated) devices because the communication channel between devices is defined and standard across the devices, e.g., as is the data transmitted across this channel. The information transmitted across this channel may be minimal, e.g., and only identifies the availability of data to work on in a predefined manner and/or a context pointer that identifies the job type information to the other device. The context pointer may point to the control and/or configuration information for the job specific operation to be performed on a specific device. This context pointer may be provided during initialization (e.g., of a device) by the processor (e.g., CPU) along with channel information and setup for communication between devices. In certain embodiments, once this is done, the processor (e.g., CPU) has no involvement with data passing between the devices. Memory buffers for communication between devices may be configured (e.g., allocated) by the processor (e.g., CPU) when the channel is initialized. In certain embodiments, these buffers are described by a circular array of buffer descriptors (e.g., as discussed further below). In one embodiment, a unique buffer descriptor array exists for input buffers and another unique buffer descriptor array exist for output buffers. Each device may have its own buffer descriptor arrays for each set of input and output buffers. Each device may have a setup of input and output buffer descriptor arrays for each job context in the system. Each job context may have a defined operation as specified in the context structure for that job. When multiple (e.g., two) devices are chained together, or when the output of device 1 is desired to go to the input of device 2, the output buffer descriptor array of device 1 and the input buffer descriptor array of device 2 may be configured to point to the same physical set of buffers (e.g., shared buffers 309 in FIG. 3). In one embodiment, these physical buffers are of any arbitrary size and this information may be defined in the buffer descriptor arrays. The number of buffers may also be any number, e.g., with an upper limit imposed by design resource constraints. Device 1's output buffer descriptor array and associated control variables may be initialized to indicate that certain (e.g., all) buffers in the array are available to store output for device 1 (e.g., to be used as input to device 2).

For example, with two devices to offload work to in succession, a processor (e.g., CPU) may offload to a device and enable the direct communication between that device and another device through shared memory buffers and hardware (e.g., and a communication protocol), e.g., to eliminate the processor (e.g., CPU) as the intervener between the offload to successive devices. Certain embodiments herein allow the direct communication of a plurality of (e.g., two) device through shared buffers, e.g., to eliminates the need to interrupt the processor (e.g., CPU) to handle data input and output between the two devices. In one embodiment, instead, the devices handle this communication in a low latency direct method. FIG. 1 shows the flow for the desired offload of two functions in immediate succession that does not use device to device communication. FIGS. 2A-2B shows the flow when using direct device to device communication, e.g., as discussed in reference to FIGS. 3-4.

Figure 3:
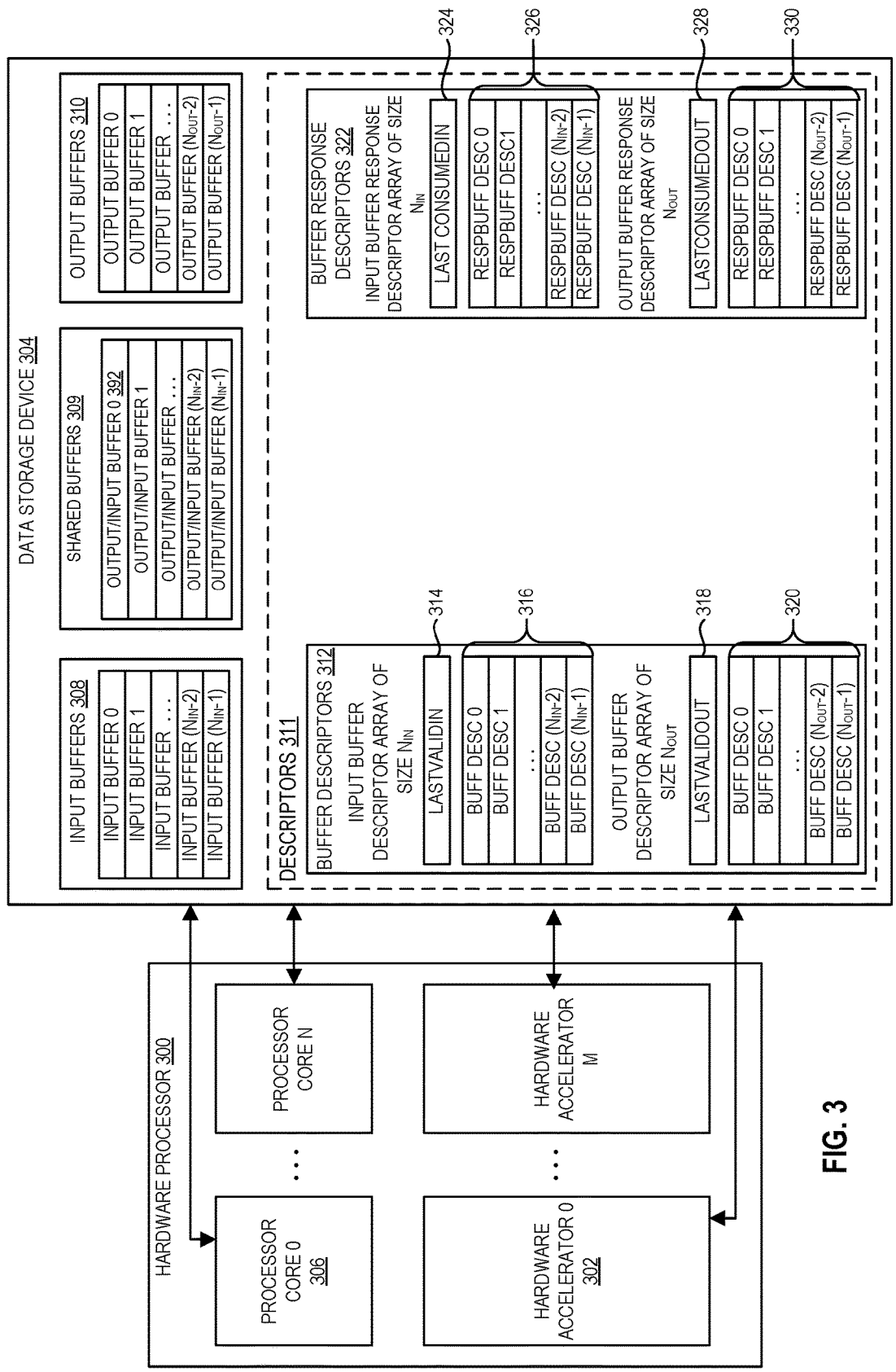
FIG. 3 illustrates a hardware processor including a plurality of cores and hardware accelerators according to embodiments of the disclosure.

FIG. 3 illustrates a hardware processor 300 including a plurality of cores (e.g., core 0 (106) to core N) and hardware accelerators (e.g., accelerator according to embodiments of the disclosure. In one embodiment, N may be 1 or more and/or M may be 1 or more. Hardware processor 300 (e.g., accelerator(s) and/or core(s) thereof) may be coupled to a data storage device 304 (e.g., memory). In one embodiment, memory may be dynamic random access memory (DRAM), private (e.g., private to an accelerator) random access memory (RAM), cache memory, or system memory. Although a plurality of cores (0 to N) are depicted, a single hardware core may be utilized, e.g., core 0 (306). A hardware accelerator may be a hardware offload circuit (e.g., logic circuit).

A processor 300 (e.g., core 306) may receive a request (e.g., from software) to perform an operation and may offload (e.g., at least part of) the operation (e.g., thread) to a hardware accelerator (e.g., accelerator 302). Cores, accelerators, and data storage device 304 may communicate (e.g., be coupled) with each other. Arrows indicate two way communication (e.g., to and from a component), but one way communication may be used. In one embodiment, a (e.g., each) core may communicate (e.g., be coupled) with the data storage device, for example, one or more of: input buffers 308, shared buffers 309, output buffers 310, buffer descriptors 312, and response descriptors 322. In one embodiment, an (e.g., each) accelerator may communicate (e.g., be coupled) with the data storage device, for example, one or more of: input buffers 308, shared buffers 309, output buffers 310, buffer descriptors 312, and response descriptors 322. In one embodiment, shared buffers 309 include a plurality of shared buffers, e.g., shared by a plurality of hardware accelerators and/or a plurality of cores, or a combination thereof. In one embodiment, a first accelerator is to generate output data and store it in (e.g., output/input buffer 0 392) shared buffers 309 and a second accelerator is to consume that output data as the second accelerator's input data.

In one embodiment, a hardware accelerator is in processor 300. Hardware accelerator (e.g., each hardware accelerator) may be coupled to (e.g., its own or a shared) input buffer and/or output buffer, e.g., to receive a stream of input data to operate on to produce output data. Hardware accelerator (e.g., each hardware accelerator) may be coupled to one or more of: a plurality of input buffers 308 to store the input data, a plurality of shared buffers 309, a plurality of output buffers 310 to store the output data, buffer descriptors 312 storage, and buffer response descriptors 322, for example, as discussed further below. Buffer descriptors 312 may include one or more of: an input buffer descriptor storage (e.g., array 316 with an entry for each respective input or shared buffer) and/or pointer 314 to the last valid input or shared buffer, and an output buffer descriptor storage (e.g., array 320 with an entry for each respective output or shared buffer) and/or a pointer 318 to the last valid output or shared buffer. Buffer response descriptors 322 may include one or more of: an input buffer response descriptor storage (e.g., array 326 with a corresponding response entry for each respective input or shared buffer) and/or a pointer 324 to the last consumed input or shared buffer, and an output buffer response descriptor storage (e.g., array 330 with a corresponding response entry for each respective output or shared buffer) and/or a pointer 328 to the last consumed output or shared buffer. An input and/or output buffer descriptor entry may include a pointer to an (e.g., input, shared, or output) buffer, a size of the data in that buffer, a buffer flag, or any combination thereof. An input, shared, and/or output return buffer descriptor entry may include a size of the data in the buffer (e.g., the size of the data remaining in an input or shared buffer and/or the size of the unused portion of an output or shared buffer), a buffer flag, or both (e.g., but without a pointer). The term size of the data may refer to the total size of the data, for example, not the size of each element of multiple elements of data. In one embodiment, the number of entries in the storage (e.g., array 316 and array 326) for the input buffer descriptors and input buffer response descriptors is the same as the number of input (and shared) buffers used (e.g., for a context) for example, allocated, e.g., $N_{IN}$. Additional or alternatively, the number of entries in the storage (e.g., array 320 and array 330) for the output buffer descriptors and output buffer response descriptors is that same as the number of output (and shared) buffers used (e.g., for a context), for example, allocated, e.g., $N_{OUT}$. In one embodiment, a buffer may be a circular buffer. Although the pointers are shown as adjacent to the arrays, other embodiments may store the pointers elsewhere, e.g., local to an accelerator.

In one embodiment, each device (e.g., accelerator) has a respective descriptor 311. In one embodiment, each output buffer descriptor and respective output buffer response descriptor of an accelerator (e.g., accelerator 1 in FIGS. 2A-2B or accelerator 0 in FIG. 3) points to a same buffer (e.g., buffer 0 392 in FIG. 3) of the shared buffers 309 and each input buffer descriptor and respective input buffer response descriptor of a different accelerator (e.g., accelerator 2 in FIGS. 2A-2B or accelerator M in FIG. 3) points to that same buffer (e.g., buffer 0 392 in FIG. 3) of the shared buffers 309.

In one embodiment, referring to FIG. 2B, accelerator 1 may fill output buffer(s), write new LastValidIn value and buffers sizes (e.g., in a command packet) and then (e.g., by executing an ENQ operation) transmit that data (e.g., in the command packet) to accelerator 2 and/or accelerator 2 may consume the input buffers, write LastValidOut value and buffer sizes (e.g., in a command packet), and then (e.g., by executing an ENQ operation) transmit that data (e.g., in the command packet) to accelerator 1 (e.g., to indicate that data has been consumed). In one embodiment, a processor (e.g., core) is to write the descriptors and/or transmit a new LastValidIn (e.g., in a command packet) then (e.g., by executing an ENQ operation) transmit that data (e.g., in the command packet) to accelerator(s).

In one embodiment, when accelerator 0 receives input data from the processor (e.g., CPU) (e.g., or other device) it is to begin processing when it has both input buffers and output buffers available. In one embodiment, once accelerator 0 fills an output buffer (e.g., or encounters some other signal on the input indicating that it should transmit current completed data) it may mark the buffer as full/complete and send a command packet to accelerator 1 indicating that a buffer is ready for processing in the circular buffer descriptor array. In one embodiment, because the buffer descriptor arrays were configured to point to the shared (e.g., physical) buffers before processing began, (e.g., all) accelerator 1 has to do when the command packet is received is to lookup the context structure pointed to by the included context structure pointer, and mark a buffer(s) as ready to process in the context structure for the associated job, e.g., according to the number of buffers communicated as ready in the command packet. Accelerator 1 may then begin processing data from accelerator 0 assuming it has output buffers to store data to (for example, with output buffers provided to accelerator 1 by the processor (e.g., CPU), e.g., with command packets coming from the processor). Once accelerator 1 finishes consuming an input buffer, it may generates and send a command packet back to accelerator 0 indicating that buffer is ready for it to use. Accelerator 1 thus may pass empty buffers back to accelerator 0. In certain embodiments, the semantics of how the buffers are passed are the same regardless of whether they are empty or full, e.g., though the size field may have a slightly different meaning depending on whether a buffer is used for input or output (e.g., for buffers used for input, the size field may indicate actual amount of data available and for buffers used for output, the size field may indicate the buffer size available for writing data). Accelerator 1 may send a signal (e.g., an interrupt) to the processor (e.g., CPU) indicating when accelerator 1's output buffers have been filled to allow the processor (e.g., CPU) to access the data. Other notification methods are possible to the processor. In one embodiment, error conditions from Accelerator 0 or accelerator 1 are signaled directly to the processor (e.g., CPU), for example, via an interrupt. In one embodiment, this shared buffer passing back and forth continues for as long as data is available for accelerator 0 to process and send to accelerator 1. In one embodiment, once the application is finished processing data, it simply is to destroy the contexts for both accelerators (e.g., devices) and/or deallocate memory associated with the job. The physical memory buffers for data passing may be DRAM (e.g., which may translate to LLC hits in many cases) or may be high bandwidth memory within the package. Regarding setup, a device and/or the driver for the device that supports chaining may have the following capabilities: the ability to specify the channel command packet port for the device to exchange data with another device, the context structure pointer of the job associated with that other device (e.g., and a mechanism to get this pointer for itself to provide it to another device), and the ability to specify whether input or output is coming from a device utilizing the command packet semantics or from the processor. In one embodiment, there is an interconnect (e.g., ring) privileged call to configure the process address space identifier (PASID) for command packet transactions generated by a device, for example, if the device receiving the data is running under a different PASID than the one generating the data (e.g., as may be the case when using shared memory between processes or virtual machines).

The following are example elements of a context structure. The context structure may be allocated when a new context is setup and be valid until the context is destroyed. In one embodiment, a context structure contains one or more of: static job info, circular array of buffer descriptors for input, circular array of buffer descriptors for output, circular buffer response descriptors for input and output. In one embodiment, buffer descriptors and response descriptors are matched one to one (1:1). In one embodiment of a chaining implementation, the accelerators are to write the response descriptors for buffers in use for communication with another device, for example, but the response descriptors are not read by the other accelerator, e.g., and are only used in the event of an error handled by the processor (e.g., CPU). In one embodiment, buffer descriptors describe input, shared, and/or output buffers and may contain pointer, size, and/or flags. In one embodiment, the size is the amount of data (e.g., bytes) passed in and/or space available for output. In one embodiment, flags are buffer based. In one embodiment, response descriptors may include no pointer, do include the size (e.g., data placed in output or left in input) and/or flags (e.g., if last portion of data (e.g., byte) of a flush is in an output).

Figure 4:
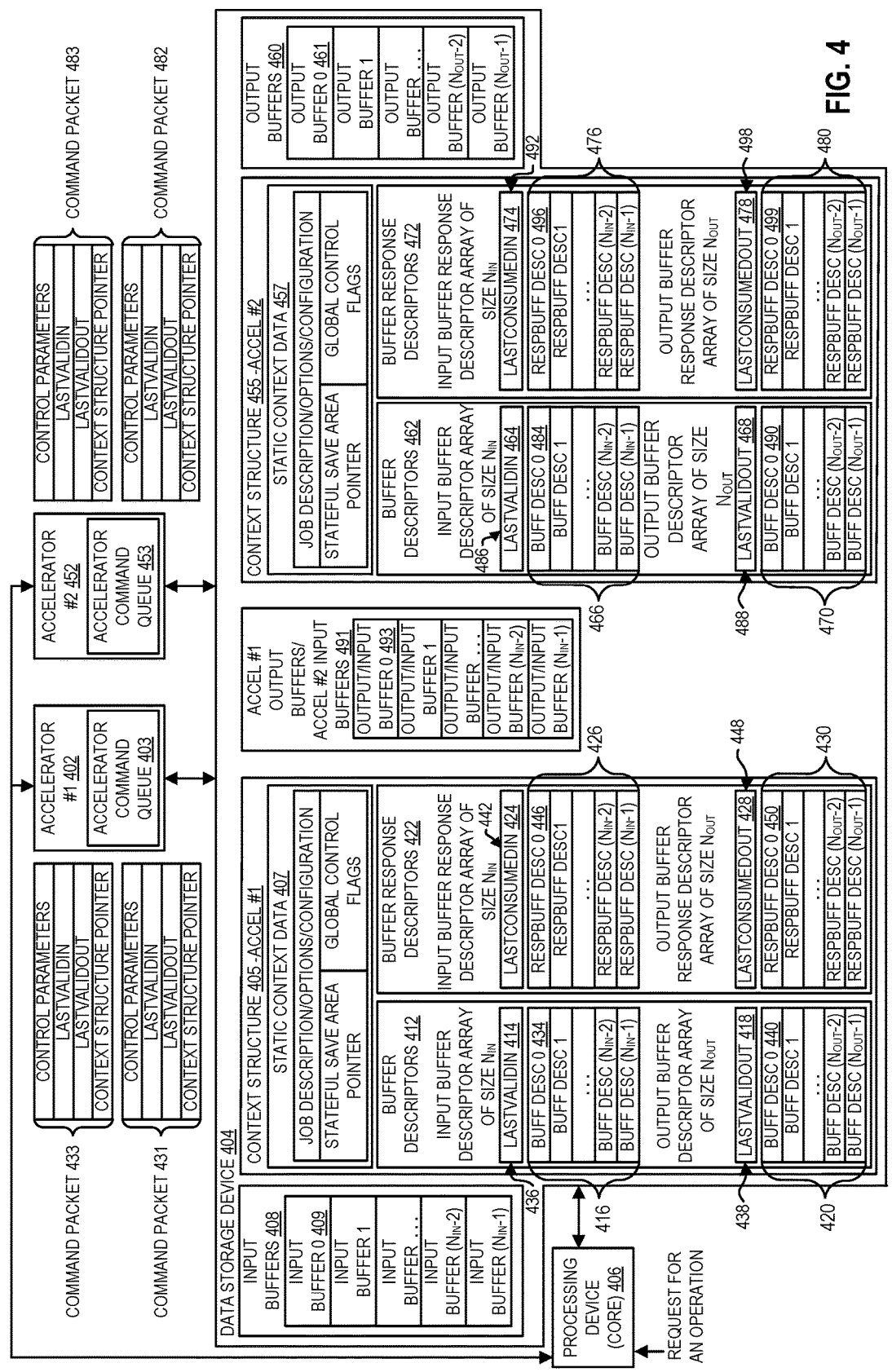
FIG. 4 illustrates a hardware processing device and hardware accelerators according to embodiments of the disclosure.

An example operation will now be discussed in reference to FIG. 4. FIG. 4 illustrates a hardware processing device 406 (e.g., core) and hardware accelerator 1 (402) and hardware accelerator 2 (452) according to embodiments of the disclosure. Depicted hardware processing device 406 and accelerators 402 and 452 may communicate (e.g., via a coupling or other connection) with data storage device 404 (e.g., memory).

A processing device (e.g., core) 406 may receive a request (e.g., from software) to perform an operation and may offload the operation (e.g., thread) to hardware accelerator 1 402. Request(s) may be stored in each respective, optional accelerator command queue (403, 453), which may be local to each accelerator or separate therefrom. In one embodiment, hardware accelerator 1 is coupled to one or more of: a plurality of input buffers 408 to store the input data for accelerator 1, (e.g., the input of) a plurality of shared buffers 491 to store output data from accelerator 1 (e.g., which will be used as input data for hardware accelerator 2 (452)), buffer descriptors 412 storage, and buffer response descriptors 422 storage. In one embodiment, a hardware accelerator (e.g., accelerator 1) is coupled to one or more of: a plurality of input buffers to store the input data, a plurality of shared buffers to store (e.g., a set of) output/input data, a plurality of output buffers to store the output data (e.g., to receive a stream of input data to operate on to produce output data), buffer descriptors storage, and buffer response descriptors storage. Buffer descriptors may include one or more of: an input buffer descriptor storage (e.g., array with an entry for each respective input buffer) and/or pointer to the last valid input buffer, and an output buffer descriptor storage (e.g., array with an entry for each respective output buffer) and/or a pointer to the last valid output buffer. Buffer response descriptors may include one or more of an input buffer response descriptor storage (e.g., array with a corresponding response entry for each respective input buffer) and/or a pointer to the last consumed (e.g., by the accelerator) input buffer, and an output buffer response descriptor storage (e.g., array with a corresponding response entry for each respective output buffer) and/or a pointer to the last consumed (e.g., by the accelerator) output buffer.

In one embodiment, hardware accelerator 2 is coupled to one or more of: (e.g., the output of) a plurality of shared buffers 491 to provide input data to accelerator 2 (e.g., buffers which are shared with hardware accelerator 1 and used as output buffers by accelerator 1), a plurality of output buffers 460 to store the output data from accelerator 2, buffer descriptors 462 storage, and buffer response descriptors 472 storage. In one embodiment, a hardware accelerator (e.g., accelerator 2) is coupled to one or more of: a plurality of input buffers to store the input data, a plurality of shared buffers to store output/input data, a plurality of output buffers to store the output data (e.g., to receive a stream of input data to operate on to produce output data), buffer descriptors storage, and buffer response descriptors storage.

In one embodiment, each device (e.g., accelerator) has a respective descriptor context structure (405, 455), e.g., descriptors 412 & 422 for accelerator 1 and descriptors 462 & 472 for accelerator 2. In one embodiment, each output buffer descriptor (e.g., buffer descriptor 0 (440)) and respective output buffer response descriptor (e.g., buffer descriptor 0 (450)) of an accelerator (e.g., accelerator 1 (402)) points to a same shared buffer (e.g., output/input buffer 0 (493)) of the shared buffers 491 and each input buffer descriptor (e.g., buffer descriptor 0 (484)) and respective input buffer response descriptor (e.g., buffer descriptor 0 (496)) of a different accelerator (e.g., accelerator 2 (452)) points to that same shared buffer (e.g., output/input buffer 0 (493)) of the shared buffers 491.

An input and/or output buffer descriptor entry may include a pointer to a (e.g., input, shared, or output) buffer (e.g., buffers 0 to N−1), a size of the data in that buffer, a buffer flag, or any combination thereof. An input and/or output return buffer descriptor entry may include a size of the data in the buffer (e.g., the size of the data remaining in an input or shared buffer and/or the size of the unused portion of an output or shared buffer), a buffer flag, or both (e.g., but without a pointer). The term size of the data may refer to the total size of the data, for example, not the size of each element of multiple elements of data. In one embodiment, the number of entries in the storage (e.g., array 416 and array 426 and/or array 466 and array 476) for the input buffer descriptors and input buffer response descriptors is that same as the number of input (or shared) buffers used (e.g., for a context) for example, allocated. Additionally or alternatively, the number of entries in the storage (e.g., array 420 and array 430 and/or array 470 and array 480) for the output buffer descriptors and output buffer response descriptors is the same as the number of output (or shared) buffers used (e.g., for a context), for example, allocated. In one embodiment, a buffer may be a circular buffer. Although the pointers are shown as adjacent to the arrays, other embodiments may store the pointers elsewhere, e.g., local to an accelerator. The above may be part of a context structure (405,455), e.g., with a single context for each operation on an entire data set. A context structure may include static context data (407,457), for example, including one or more of: a field for a job description (e.g., job identification (ID) or other work descriptor(s)), options, configurations, state save area pointer, and global control flags.

As an example, processing device 406 may receive a request for an operation, (e.g., a compression or decompression operation) on an input data set. Certain examples herein discuss a compression operation. In one embodiment of a decompression operation, the examples for a compression operation may be applicable, e.g., other than output buffers may be consumed faster than input buffers for decompression while compression may consume input buffers faster than output buffers, e.g., the hardware operation of the interface between the processing device and the accelerator may be the same in either case.

In one embodiment of sending a request to an accelerator, processing device 406 may allocate and fill some number of input buffers 408, write 436 LastValidIn pointer 414, and write (e.g., size) information in each respective entry for each buffer in input buffer descriptor array 416.

An input buffer descriptor entry (e.g., Buff Desc 0) in input buffer descriptor array 416 may include the corresponding information for that input buffer (e.g., Input Buffer 0) in input buffers 408. For example, an input buffer response descriptor entry (e.g., RespBuff Desc 0) in input buffer response descriptor array 426 may include the corresponding information for that (e.g., same) input buffer (e.g., Input Buffer 0) in input buffers 408. The variable $N_{IN}$ is used in reference to the input buffer and $N_{OUT}$ is used in reference to the output buffer in certain embodiments. In one embodiment, $N_{IN}$ and $N_{OUT}$ may be different values, for example, the number of input buffers and the number of output buffers being used (e.g., allocated) may be different. In one embodiment, $N_{IN}$ and $N_{OUT}$ may be the same value (e.g., N), for example, the number of input buffers and the number of output buffers being used (e.g., allocated) may be the same.

An output buffer descriptor entry (e.g., Buff Desc 0) in output buffer descriptor array 420 may include the corresponding information for an output buffer (e.g., Output Buffer 0) in an output buffer (e.g., shared buffers 491). For example, an output buffer response descriptor entry (e.g., RespBuff Desc 0) in output buffer response descriptor array 430 may include the corresponding information for that (e.g., same) output buffer (e.g., output Buffer 0) in an output buffer (e.g., shared buffers 491). In one embodiment, the processing device is to check that all buffers previously sent (e.g., for a context) have been consumed before reusing. Processing device 406 may write 436 LastValidIn pointer 414 to indicate the last input buffer of input buffers 408 the processing device has provided with (e.g., valid) data.

The processing device may allocate one or more shared buffers of shared buffers 491 to receive the output of accelerator 1 (402). For example, processing device may write 438 LastValidOut pointer 418 and (e.g., size) information for each entry (e.g., Buff Desc 0) of output buffer descriptor array 420. LastValidOut may indicate the last output (or shared) buffer that the processing device has provided that the accelerator may write output data. The processing device may write a go command (e.g., via an interconnect or port, such as, but not limited to, a memory-mapped input/output (MMIO) port) to the accelerator to indicate that new data is available. Notifications (e.g., asynchronous with the operations of the processing device) from the accelerator may indicate to the processing device (e.g., requestor) that the accelerator has updated the last consumed input (LastConsumedIn) and/or last consumed output (LastConsumedOut) pointers. Processing device may proceed (e.g., asynchronously of this notification) to add more (e.g., input and/or output) buffers if space is available or wait for free buffers to become available if all are in use. In one embodiment, a processing device may decode and/or execute an instruction to cause a request (e.g., a command packet) to be sent to an accelerator. In one embodiment, the allocation of input buffers and allocation of output buffers is managed (e.g., initiated) by software running on a processor, for example, based on workload considerations, e.g., throughput, number of threads running simultaneously, latency tolerance, etc. In one embodiment, the number of input buffers is any number between 1 and 16 or 4 and 16. In one embodiment, the number of output buffers is any number between 1 and 16 or 4 and 16.

Accelerator 402 may receive a command packet (431, 433) e.g., from the processing device 406. Command packet may be read (e.g., by the accelerator) and values updated, e.g., in accelerator command queue 403, and the request in the command packet may be placed at the end of the queue (e.g., in an accelerator's static random-access memory (SRAM) or system random access memory (RAM)). In one embodiment, a first queue entry may be read and processed. An accelerator may check, e.g., for a specific context, for valid shared or input and output buffers, for example, by checking LastConsumed with LastValid for input and/or output. In one embodiment, if LastValidIn does not equal LastConsumedIn, then there are input (or shared) buffer(s) available to work on. In one embodiment, if LastValidOut does not equal LastConsumedOut, then there are output (or shared) buffer(s) (or shared buffer(s)) available to store output data in. In one embodiment, if there is not both input data available and output data space available, then the accelerator may check for additional updates to input and output buffers and proceed if possible. In one embodiment, if there is both input data and output data space available, the accelerator may consume input and generate output until the supply of either input buffers or output (e.g., shared) buffers is exhausted. The accelerator 402 may (e.g., on consumption) update flags and/or data out sizes in response descriptors 422 and/or update 442 LastConsumedIn 424 and update 448 LastConsumedOut 428 variables. Accelerator may check for additional updates to input and output buffers and proceed if possible. Accelerator may send a notification (e.g., interrupt or other signal) to the processor. In one embodiment, a notification includes one or more of the following: an (e.g., general) processor (e.g., CPU) interrupt, cache line access signal (e.g., monitor and wait), and memory write to an area the processor is periodically checking (e.g., polling). A notification may be sent between an accelerator and a processor through a dedicated communication channel (e.g., line) and/or a queuing interface.

Accelerator 2 (452) may receive an indication from accelerator 1 (402), e.g., a command packet, to indicate that data is available, for example, from an update of LastValidIn and/or LastValidOut values. Accelerator 2 may look to each input buffer descriptor (e.g., buffer descriptor 0 (484)) and respective input buffer response descriptor (e.g., buffer descriptor 0 (496)) for a shared buffer (e.g., output/input buffer 0 (493)) of the shared buffers 491 to determine what data to operate on.

Initialization:

In this example, in response to the request for an operation on a data set, a processing device 406 (e.g., core or CPU) is to allocate memory for all structures for both devices within data storage device 404. Processing device 406 may initialize all memory for operation of the accelerators, e.g., including space for each device context structure (405, 455) which includes the buffer descriptor arrays for input buffers (412) for accelerator 1, output buffers 460 for accelerator 2, and the shared output/input buffers 491 that are shared between the accelerators as output buffers for accelerator 1 and as input buffers for accelerator 2. Response descriptors for accelerator 1 input 426 and output 430 and accelerator 2 (e.g., 476 & 480) may also be allocated and initialized.

Assuming for all cases, N=4, processing device 406 may initialize accelerator 1 initially as LastValidIn(414)=3, and LastConsumedIn(424)=3. E.g., at this point, there is no valid input data because these values are equal. Processing device 406 may initialize accelerator 1 initially as LastValidOut (418)=2 and LastConsumedOut(428)=3. E.g., at this point, accelerator 1 has three valid buffers available to write output data, e.g., buffers 1, 2, and 3. Processing device 406 may initialize accelerator 2 initially as LastValidIn(464)=3 and LastConsumedIn(474)=3. E.g., at this point, there is no valid input data because these values are equal. Processing device 406 may initialize accelerator 2 initially as LastValidOut (468)=2 and LastConsumedOut(478)=3. E.g., at this point, accelerator 1 has three valid buffers available to write output data, e.g., buffers 1, 2, and 3.

Processing device 406 may set up the configuration registers for the devices to manage communication of buffer management as one or more of the following: accelerator 1 input buffers notifications are selected to be sent to processing device 406, notifications from an accelerator to processing device are generated using interrupts, and processing device reads response descriptors 426 and LastConsumedIn 424 for status.

Accelerator 1 output buffers notifications may be set to be sent to a device using an I/O memory write to address JOBIN-D2 with Context Structure Pointer (e.g., 482 or 483). Response descriptor 430 and LastConsumedOut 428 may both be updated, e.g., used only by the device and not read by the processing device. Accelerator 2 input buffers notifications may be set to be sent to a device using an I/O memory write to address JOBIN-D1 with Context Structure Pointer (e.g., in command packet 431). Response descriptor 476 and LastConsumedIn 474 may both be updated, e.g., but used only by the device and not read by the processing device. Accelerator 1 input buffers (e.g., a single, shared buffer) notification(s) and/or accelerator 2 output buffers (e.g., the single, shared buffer) notification(s) may be set to be sent to processing device. Notifications from accelerator(s) to processing device may be generated using interrupts and processing device may read response descriptors 426 and LastConsumedIn 424, and response descriptors 480 and LastConsumedOut 478, respectfully, for status. The processing device in this example allocates 4 buffer descriptors for input and output, so N=4 for both accelerator 1 and accelerator 2.

The buffer descriptors for input buffers for accelerator 1 and the buffer descriptors for output for accelerator 2 may be managed by the processing device during runtime, e.g., and be changed during runtime as long as the buffers have not been submitted to the hardware. Submission may generally refer to when device has been told that a buffer is valid to work on. In this example, the buffer pointers do not change.

The (e.g., shared) output buffers for accelerator 1 and the input buffers for accelerator 2 may be used to communicate data between accelerator 1 and accelerator 2, e.g., and not change during execution after setup. In one embodiment, the buffer descriptors for output for accelerator 1 and the buffer descriptors for input for accelerator 2 are set to point to the same (e.g., physical) shared buffers, e.g., shown in FIG. 4 as 491.

Memory buffers may be allocated and buffer descriptors updated to point to these buffers. For example, four input buffers 408 for accelerator 1 may be allocated and accelerator 1's input buffer descriptors 416 may be initialized to point to these buffers, e.g., along with storing the sizes of these buffers. Four output buffers 460 for accelerator 2 may be allocated and accelerator 2's output buffer descriptors

470 may be initialized to point to these buffers, e.g., along with storing the sizes of these buffers. A plurality of (e.g., four in this example) shared buffers 491 used both for output of accelerator 1 and input of accelerator 2 may be allocated and accelerator 1's output buffer descriptors 420 may be initialized to point to these buffers, e.g., along with storing the sizes of these buffers. Accelerator 2's input buffer descriptors 466 may be initialized to point to these shared buffers, e.g., along with storing the sizes of these buffers.

At this point, shared output/input buffers 491 (e.g., shared by accelerator 1 and accelerator 2 may have been configured and ready for use. Accelerator 2's output buffers may have been configured and are ready for use. The input buffers for accelerator may have been configured, e.g., but have no data in them.

In one embodiment, processing device 406 copies the first section of data (e.g., 64 KB) to input buffer 0 (409) of accelerator 1 and the second section (e.g., 64 KB) to input buffer 1 of accelerator 1. Accelerator 1 may have output buffers available and input data ready and is to be notified that there is work to do. Processing device 406 may send a command packet 433 to accelerator 1 containing the context structure pointer for this job. The Context Structure Pointer may tell the accelerator which operational context has been updated.

Operation:

Accelerator 1 (402) may receive a command packet from the processing device. In one embodiment, the command packet (e.g., request therein) is put into an accelerator command queue 403 for later processing. In one embodiment, the command packet is the first and is (e.g., immediately) removed from the queue to begin processing. Accelerator 1 is to determine that LastConsumedIn 424 and LastValidIn 414 are not equal for input buffers, and therefore input data is available. Accelerator 1 may determine that LastConsumedOut 428 and LastValidOut 418 are not equal indicating output buffer space is available. E.g., since data is available, the accelerator may read input buffer 409 and process that data to determine a result and write (e.g., a portion or all of) that result to an output buffer 491. Assuming here that output buffer 493 is filled, but in other embodiments it may not be, e.g., other configurations are possible where the buffer is always handed off after processing an input block.

In one embodiment, because output buffer 0 (493) is filled, accelerator 1 may send a Command Packet to accelerator 2 indicating that it is to increment 486 LastValidIn 464 for accelerator 2. Accelerator 1 may increment LastConsumedIn 424 by 1 and now LastConsumedIn 424 is 1 less than LastValidIn 414. Accelerator 1 in this example still has 1 valid input buffer and 2 valid output buffers so it may continue processing. Accelerator 1 may continue processing the second input buffer of input buffers 408 and write the output to output/input buffer 1 of shared buffers 491, e.g., upon completing output. Accelerator 1 may increment LastConsumedIn by 1 and now LastConsumedIn 424 is equal to LastValidIn 414. E.g., accelerator 1 is out of input data and ceases processing.

Accelerator 1 may send an interrupt to the processing device (e.g., CPU) telling the processing device that accelerator 1 has exhausted all input buffers 408 containing valid data. This information may be communicated in the response descriptor for input buffers in 424 and 426. Accelerator 1 may send a command packet to accelerator 2 indicating accelerator 2 is to increment LastValidIn 464. In this example, accelerator 1 does not have any remaining input data but does have one output buffer available. In one embodiment, an accelerator is to have valid input and output buffers to continue, so that accelerator stops processing on this context.

After this, assume that accelerator 2 receives the command packet from accelerator 1 and places it in accelerator 2's queue 453. Accelerator 2 may (e.g., immediate) remove the command packet from the queue when it is not busy. The command packet may indicate that accelerator 2 is to increment LastValidIn 464. Accelerator 2 may increment LastValidIn 464 as directed by the command packet. Accelerator 2 may determine that LastConsumedIn 474 and LastValidIn 464 are not equal for shared buffers 491, and therefore input data is available. Accelerator 2 may determine (488, 498) that LastConsumedOut 478 and LastValidOut 468 are not equal indicating output buffer 460 space is available. Processing by accelerator 2 may begin on this context. Accelerator 2 may read data from shared buffer 0 (493) and begin processing and write the processed data to output buffer 0 (461). Upon completion of writing data to buffer 0 (461), accelerator 2 may increment 492 LastConsumedIn 474 and increment 498 LastConsumedOut 478.

Accelerator 2 may send out a command packet to accelerator 1 indicating that accelerator 1 is to increment LastValidOut 418 which informs accelerator 1 that accelerator 2 has finished using shared buffer 0 (493) and it is now available for accelerator 1 to use again. Accelerator 2 may send an interrupt to the processing device to indicate to the processing device that accelerator 2 has completed consuming output buffer 493, and the processing device can read this information from response descriptors 480 and 478. Accelerator 2 may read second command packet sent from accelerator 1 and determine that it is to increment its LastValidIn 464. Accelerator 2 may repeat certain steps above to continue processing on this context as it has one valid input buffer of shared buffers 491 and 2 valid output buffers 460. Accelerator 2 may process that input buffer and write the resultant data to a valid (e.g., space available) output buffer 460. Upon completion of the processing by accelerator 2, accelerator 2 may increment the LastConsumedIn 474 and increment LastConsumedOut 478.

Accelerator 2 may send a command packet to accelerator 1 indicating that accelerator 1 is to increment its LastValidOut 418, e.g., to inform accelerator 1 that accelerator 2 has finished using buffer 1 of shared buffers 491, e.g., and buffer 1 is now available for accelerator 1 to use again (e.g., to store output into). Accelerator 2 may send an interrupt to the processing device indicating to the processing device that accelerator 2 has completed filling an output buffer 460, (e.g., output buffer 0 (461)), for example, and the processing device may determine this information from 480 (e.g., 499) and 478.

In one embodiment, at this time all processing by accelerator 1 and accelerator 2 on this context has ceased as there is no input data available to accelerator 1 (e.g., even though there are remaining shared buffers 491) and one output buffer 460 remaining for accelerator 2. In one embodiment, the processing device is to submit more input data (e.g., using a command packet to accelerator 1) to continue use. In this example, the processing device is to only process one more input buffer 408 before it is to send additional output buffers to accelerator 2, e.g., using a command packet. The code sending input buffers to accelerator 1 and the code sending output buffers to accelerator 2 may be the same code or different code.

In certain embodiments, processing continues as long as the processing device provides more input buffers with input data to accelerator 1 and more storage space available in output buffers to accelerator 2. The shared input/output buffers 491 may be handed back and forth between the two devices without processing device intervention as they are consumed and freed respectively.

While FIG. 4 shows two devices, certain embodiments herein support multiple devices daisy chained, e.g., where the buffers between devices are shared and the only buffers managed during operation by the processing device (e.g., CPU) are the input buffers to the first device in the chain and the output buffers from the last device in the chain.

Context Teardown:

In on embodiment, once all input has passed through the chained devices, and the processing device has determined that there is no more data to process, then the processing device may send a message to the devices to tear down the contexts and/or the processing device to free all allocated memory.

One embodiment of a hardware acceleration request manager may be discussed in reference to its interaction with the processor, for example, by looking at the application programming interface (API) between the software drivers (e.g., of a software program requesting an operation) and the accelerator hardware. Initially, a (e.g., compression, decompression, or other accelerator specific) job may be created for the accelerator, for example, by being offloaded from the processor. In one embodiment, the software, processor, and/or the accelerator may reference this job via some unique job identification (e.g., Job ID). The job may have an associated context structure, for example, which is then used for the lifetime of the job, e.g. a job may be the compression or a decompression of a (e.g., large) file via numerous calls to the accelerator. In one embodiment, the context structure may include one or more of: static context data, for example, job information (e.g., a work descriptor), an (e.g., circular) array of buffer descriptors corresponding to the input and output buffers, and an (e.g., circular) array of buffer response descriptors corresponding to the input and output buffers. The input buffer descriptor array (and/or the LastValidIn pointer) and the output buffer descriptor array (and/or the LastValidOut pointer) may be grouped together in one portion (e.g., as shown stored in data storage device 404), stored local to the processing device (e.g., core) (e.g., to be updated by the processor), or they may be separate and stored apart. The input buffer response descriptor array (and/or the LastConsumedIn pointer) and the output buffer response descriptor array (and/or the LastConsumedOut pointer) may be grouped together in one portion (e.g., as shown stored in data storage device 404), stored local to the accelerator (e.g., to be updated by the accelerator), or they may be separate and stored apart. In one embodiment, buffer descriptors (e.g., Buff Desc) describe the content of corresponding shared or input and output buffers, which may include one or more of the following fields: pointer (e.g., pointer to the particular buffer), data size, and flags. Size may include bits or bytes passed in and/or space available to store data. Flags may be buffer based flags. In one embodiment, response buffer descriptors (e.g., RespBuff Desc) may include one or more of the following fields: no pointer, a size, and flags. Size may include the bits or bytes passed into an output buffer and/or remaining in a shared or input buffer. Flag may indicate an EOF, e.g., the last byte of output in response to a flush or EOF command in an input buffer descriptor. In this example, the shared or output buffer may be considered consumed on reading of the flag and the LastValidOut value may be incremented to reflect that this output buffer is complete, e.g., no further data is loaded into the shared or output buffer regardless of whether it is actually full (e.g., where full refers to all memory in the buffer is used). In one embodiment, the buffer descriptors and response descriptors are matched one to one for each buffer. In certain embodiments, buffers and their descriptors may be included for each of multiple input data sets (e.g., streams) and/or multiple output data sets (e.g., streams).

Once a job has been created, the processor (e.g., software running on the processor) may allocate buffers for the job. As the accelerator(s) processes the data in the input buffers and/or the processor consumes (e.g., reads or destroys) the output data, the input and/or output buffers may be returned to software, e.g., via a notification mechanism, such as, but not limited to, interrupts and polling.

Buffer Submission: a job may contain a number of data sets (e.g., streams), for example, 2 or 3, e.g., one input and one or two output. Each data set (e.g., stream) may be represented by an (e.g., circular array) set of buffer descriptors and response descriptors. In one embodiment, each buffer descriptor entry may contain one or more of the following: a pointer to the respective buffer, the size of the buffer (e.g., the amount of data for an input buffer and the amount of space for an output buffer), and flags. For example, the buffers may be fixed in length, e.g., with their size and/or location determined at job creation time. Input and/or output (e.g., shared) buffers may be sent to the accelerator by writing to some address, for example, with the information accordingly added for each buffer as an entry in the descriptors (e.g., in a circular array). In one embodiment, the information includes the number of buffers added. Each such buffer descriptor may be implicitly owned by a respective hardware accelerator after this point, e.g., such that the processor and/or software may not modify that data until the buffer is returned, e.g., by the accelerator to another accelerator, the processor, and/or software.

Note that writing to the hardware (e.g., to the descriptors) the number of buffers added to each job (e.g., context) is one example to submit buffers to an accelerator. In another embodiment, the number of buffers in each job (e.g., context) may be written into the context structure, e.g., and the processor may send a request signal to the accelerator that the accelerator check the context structure for this information.

Response Mechanism: the response mechanism may be that some data is written to a specific memory address, e.g., where the details of the response are in the data that was written. Exemplary mechanisms as to how the processor or other accelerators are to view (e.g., be notified of) this data includes, but is not limited to: doing a (e.g., software) poll of that address, to monitor that address and wait until it is updated, or an (e.g., user-level) interrupt may instruct the thread to execute on the accelerator to wake up and view the address.

In one embodiment of returning buffers (e.g., from an acceleration operation), two types of information may be sent from the accelerator to another accelerator or the processing device to return buffers: (1) what buffers are being returned, and (2) how much of the buffer was used. One embodiment to do so is to have a memory region for buffer response (e.g., return) data, for example, buffer response descriptors. In one embodiment, the accelerator may (e.g., periodically) write this information, for example, along with sending a notification to the accelerator requestor (e.g., processor or other accelerator). In one embodiment, e.g., when the accelerator does not detect when that information is read (e.g., by hardware or software), the information may be cumulative data and not incremental data, e.g., for a context. One example mechanism for indicating which buffers are returned is through a count per stream of buffers returned, for example, where the buffer return data would consist essentially of one count per stream (e.g., 2 to 3 counts) and may be accompanied by a series of size fields, e.g., one corresponding to each buffer descriptor.

As another example, assuming a data set of a total size (e.g., a 200 KB file), each input buffer (e.g., storage) may be less than the total size (e.g., each input buffer may store 64 KB of data). In one embodiment, the operation of the accelerator on a particular context is not tied directly to a request and/or response model. For example, multiple sets of data may be enqueued on a single context (e.g., given enough buffers, buffer descriptors storage, and buffer response descriptors storage) and the accelerator may be free to work on that context's data independently of the submission order of data with respect to other contexts. For example, the accelerator may prevent swapping between contexts because of the decoupling of submission and execution order. Within a context, the operation (e.g., compression or decompression) may be executed in submission order, but no ordering with other contexts may be required.

Figure 5:
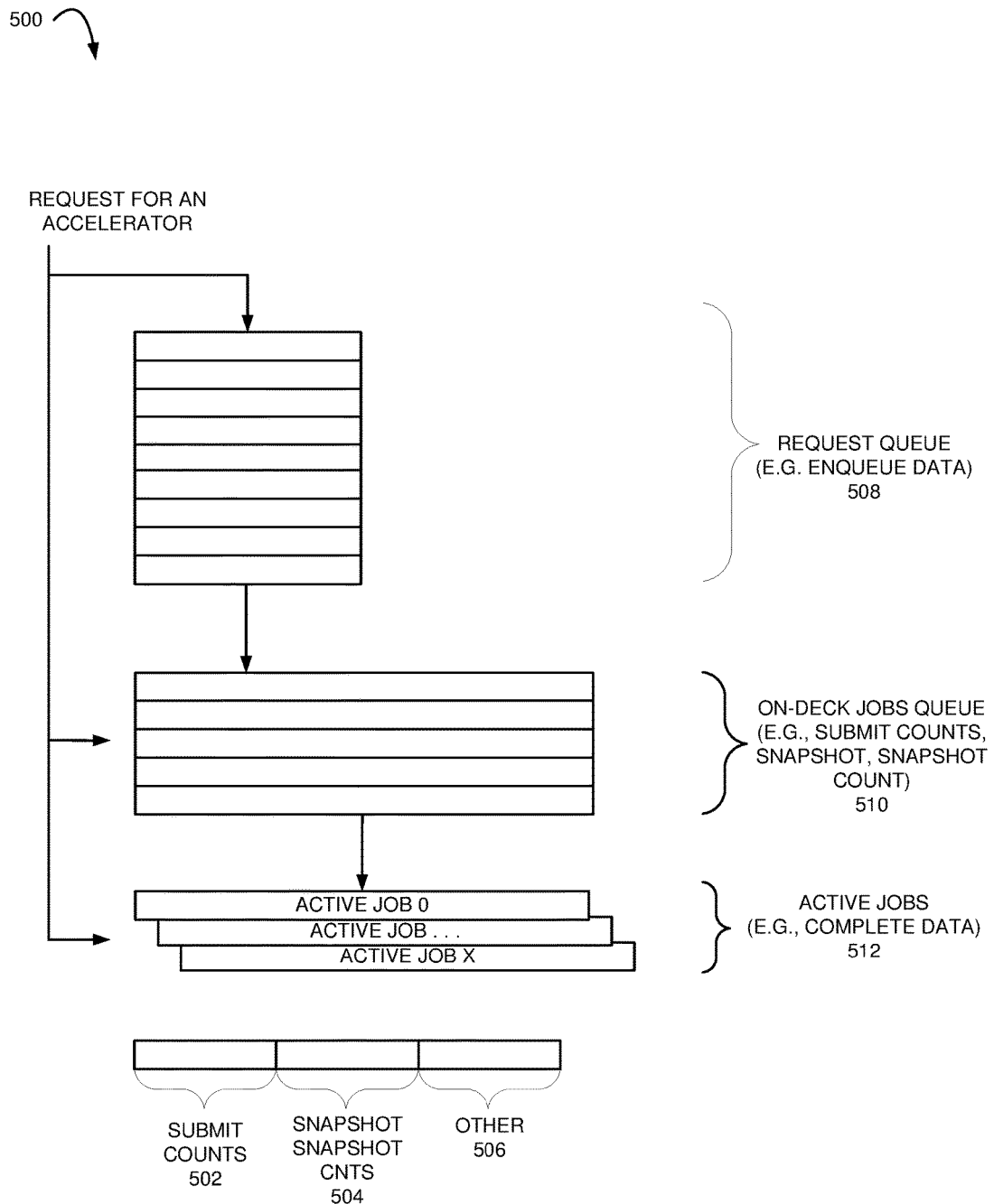
FIG. 5 illustrates a flow diagram according to embodiments of the disclosure.

FIG. 5 illustrates a flow diagram 500 according to embodiments of the disclosure. One example of the architecture of a hardware accelerator includes a (e.g., hardware) acceleration request manager to manage requests to the accelerator or accelerators. This may be centralized or each accelerator may include its own acceleration request manager. In the following discussion, reference may be made to a single stream but this may be applicable to embodiments with multiple streams. The number of job requests added to the request queue or returned (e.g., to the requestor (e.g., software)) may be defined by a counter (e.g., $N_{IN}$ and/or $N_{OUT}$). The number of job requests added to the queue by the requestor (e.g., processing device or software) may be called the Submit Count 502. It may be represented by a value in the context data structure in data storage device, and may also sent to the respective accelerator, e.g., via the execution of an instruction to enqueue a request. At certain times, there may also be a version of the Submit Count stored within the manager. One embodiment may send the counts to the hardware, e.g., in the command packet, such as, but not limited to, command packets in FIG. 4. In another embodiment, the counts may be stored in the context structure, e.g., only in the context structure. The return count may be the number of buffers returned to the requestor (e.g., processing device or software) by the accelerator. This may also be a value in the context data structure. There may be within the manager, a copy of the Buffer Descriptors, e.g., along with a copy of the submit count. This copy will be called the Snapshot and the Snapshot Count. The snapshot may be a copy which is out of date. The Job ID may be a combination of the Process ID and the address of the context structure. The Job ID may be stored in a context structure, but may (e.g., also) be stored in separate memory (e.g., internal or external) to allow the processor (e.g., accelerator) to quickly index certain data internally, for example, buffer descriptor copies. In one embodiment, buffer descriptors are stored in memory and the processor or accelerator takes a snapshot of the state of the buffer descriptors and operates on them. The buffer descriptors may be updated by the processor while the accelerator is using the now stale copy. The snapshot count in one embodiment may include this (e.g., potentially) stale copy of the submission count that is stored in the context structure that is up to date. In one embodiment, there is a submission count for the input buffers and a submission count for the output buffers when the input and output buffers are decoupled. In one embodiment when input and output buffers are coupled (e.g., synced) there may be one submission count.

In one embodiment there may be a plurality of accelerators, for example, accelerators of different types, e.g., a compression accelerator, a decompression accelerator, an accelerator for each of specific compression and/or decompression algorithms. Each type may be managed separately, e.g., as described below.

There may be a set of data associated with each accelerator referred to as the active job (for example, active jobs 0 to X, e.g., stored in active jobs field 512). An active job data set may include the information to manage that job. There may be an on-deck jobs queue 510 (e.g., less than about 10, 8, 7, 6, 5, 4, or 3 entries) which may include the data from the context structure for that job (e.g. the buffer descriptor snapshot, the counts, pointers to the save/restore, etc.). In one embodiment, an (e.g., each) entry in the on-deck jobs queue includes the data to start a job on an accelerator, e.g., when an accelerator becomes available. There may be a request queue 508, e.g., of a larger size than the on-deck jobs queue 510. In one embodiment, an (e.g., each) entry in the request queue 508 may include the data for the requests that are not active or on-deck.

In one embodiment, when a request for an operation is received (e.g., a request to perform an operation by the processor and/or to be offloaded to the accelerator, the Job ID may be effectively compared to the Job ID for the active jobs 512 and the on-deck jobs queue 510. In one embodiment, if there is a match, the appropriate state is updated, for example, otherwise that request may be added to (e.g., the end of) the request queue 508. When an accelerator becomes available, there may be an on-deck job ready to be immediately started on it from the on-deck jobs queue 510. In one embodiment, when there is space in the on-deck jobs queue 510, requests may be loaded thereto from the request queue 508. In one embodiment, if the next job from the request queue 508 is not ready for an operation by the accelerator (e.g., if its input buffers are empty or output buffers are full), then the job may be stalled (or thrown away) and otherwise it may be added to the on-deck jobs queue 510. In certain embodiments, if the job is not ready for an operation by the accelerator, the job will not be ready for acceleration unless there is a later request increasing its available buffer counters. Table 1 below illustrates one example of processing a request for an accelerator by an acceleration request manger.

TABLE 1

| | IF REQUEST: | REQUEST GOES TO: |
|---|---|---|
| 1 | MATCHES AN ACTIVE JOB | ACTIVE JOB |
| 2 | AN ACCELERATOR IS AVAILABLE, THE ON DECK JOBS QUEUE IS EMPTY, AND JOB IS READY FOR EXECUTION | ACTIVE JOB |
| 3 | MATCHES AN ON DECK JOB | ON DECK JOBS QUEUE |
| 4 | SPACE IS AVAILABLE IN THE ON DECK JOBS QUEUE, THE REQUEST QUEUE IS EMPTY, AND JOB IS READY FOR EXECUTION | ON DECK JOBS QUEUE |
| 5 | IS OTHERWISE | REQUEST QUEUE |

In one embodiment, when a job request is being considered for insertion into the on-deck jobs queue 510 (e.g., where the request comes either directly from a request for the accelerator or from the request queue 508), initially the submit counts from the request itself may be available. In one embodiment, the submit counts are the number of available buffers submitted for both input and output, for example, as another way of handling LastValidIn and LastValidOut. There may be a submission count (e.g., for each of input and output) and the processor or accelerator may track a consumed count for each of input and output. In certain embodiments, the next step may be to read the relevant portions of the context structure, e.g., to view the return counts (e.g., the pointers) and/or buffer descriptors. In one embodiment, if any of the return counts match the corresponding submit count, then that queue may be empty, and the job is not ready for acceleration, e.g., that that request may be dropped. If the queue is not empty, the data may be written into the on-deck jobs queue 510. This copy of the Buffer Descriptors and Submit Counts may be referred to as a snapshot (e.g., snapshot 504). In one embodiment, submit counts 502 may be a (e.g., rolling) counter that is at least one counter tick greater that the number of buffers in the input stream (e.g., array). There may be a submit count for every input stream, e.g., unless the buffers are synchronized. In one embodiment, snapshot counts are the last snapshot of the submission counts that the accelerator (e.g., or accelerator request manager) read from memory. In one embodiment, submission counts are computed from job request data, e.g., so the processor (e.g., accelerator) determines whether the snapshot data is stale. Other data 506 may include a context pointer to read the context information.

In one embodiment, every job in the on-deck jobs queue 510 may be ready for acceleration, e.g., the job's snapshot has at least one input buffer with data and one output buffer with available space in every stream. There may be two sets of counts in each entry in the on-deck jobs queue (e.g., and for each the Active Job): one set of counts for the snapshot, and a second set of counts for the latest known counts. In one embodiment, initially these may be the same, but if a request comes in that matches an entry in the on-deck jobs queue, the submit counts may increase, e.g., whereas the snapshot counts do not. This may indicate that the snapshot is out of date, e.g., that there are more buffers available than what is indicated in the snapshot.

In one embodiment for updating a snapshot, when the number of entries (e.g., in the snapshot) in any input buffer or output buffer goes to 0 or 1, and the corresponding submit count 502 (e.g., as updated by a request) is greater than 1, the request manager and/or accelerator may reread the submit counts 502 and buffer descriptors and buffer response descriptors, and then update the (e.g., stale) snapshot accordingly. In one embodiment, this may be triggered by either the accelerator finishing use of a buffer (e.g., and returning it) to reduce the counts, or by a request matching this job and increasing the submit counts 502.

Figure 6:
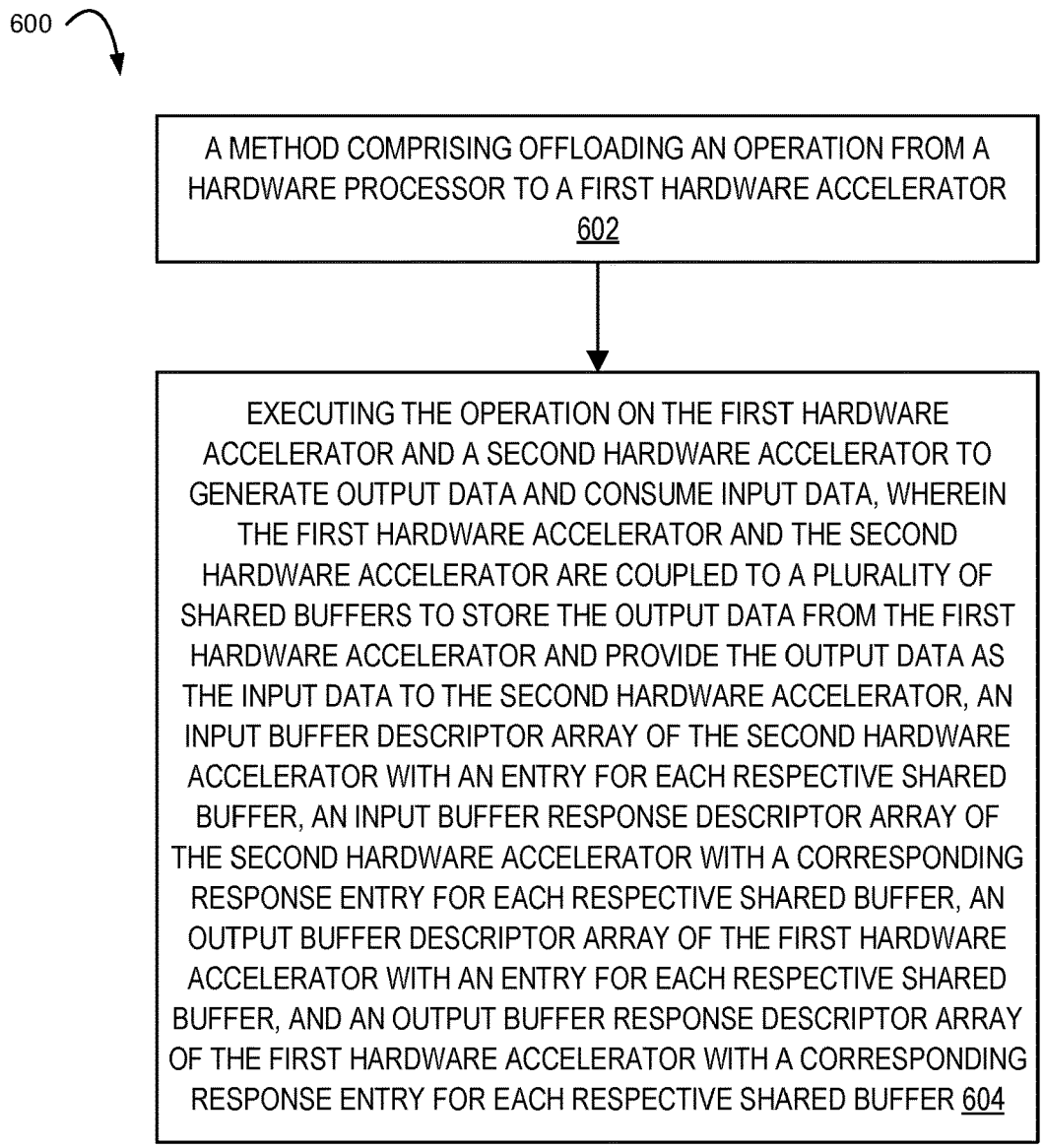
FIG. 6 illustrates a flow diagram of an acceleration operation according to embodiments of the disclosure.

FIG. 6 illustrates a flow diagram 600 of an acceleration operation according to embodiments of the disclosure. Depicted flow 600 includes offloading an operation from a hardware processor to a first hardware accelerator 602; and executing the operation on the first hardware accelerator and a second hardware accelerator to generate output data and consume input data, wherein the first hardware accelerator and the second hardware accelerator are coupled to a plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer 604.

In one embodiment, a hardware processor includes a core to execute a thread and offload an operation; and a first hardware accelerator and a second hardware accelerator to execute the operation to generate output data and consume input data, wherein the first hardware accelerator and the second hardware accelerator are coupled to a plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer. The second hardware accelerator may compare an index for a last valid input entry of the input buffer descriptor array to an index for a last consumed input response entry of the input buffer response descriptor array to determine when the second hardware accelerator may execute to consume input data from the plurality of shared buffers, and the first hardware accelerator may compare an index for a last valid output entry of the output buffer descriptor array to an index for a last consumed output response entry of the output buffer response descriptor array to determine when the first hardware accelerator may execute to generate output data into the plurality of shared buffers. The second hardware accelerator may perform the compare and the first hardware accelerator may perform the compare without involvement from the core. The core may allocate the plurality of shared buffers, and load the entries in the input buffer descriptor array for each respective shared buffer. The core may load the entries in the output buffer descriptor array for each respective shared buffer. The first hardware accelerator may load the plurality of shared buffers with the output data and load the corresponding response entries in the output buffer response descriptor array for each respective shared buffer consumed. The second hardware accelerator may load the corresponding response entries in the input buffer response descriptor array for each respective shared buffer consumed. The entries in the input buffer descriptor array may each include a size of the input data stored in the respective shared buffer, the corresponding response entries in the input buffer response descriptor array may each include a size of the input data remaining in the respective shared buffer, the entries in the output buffer descriptor array may each include a size of the respective shared buffer available to store output data, and the corresponding response entries in the output buffer response descriptor array may each include a size of the output data stored in the respective shared buffer.

In another embodiment, a method includes offloading an operation from a hardware processor to a first hardware accelerator; and executing the operation on the first hardware accelerator and a second hardware accelerator to generate output data and consume input data, wherein the first hardware accelerator and the second hardware accelerator are coupled to a plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer. The method may further include comparing an index for a last valid input entry of the input buffer descriptor array to an index for a last consumed input response entry of the input buffer response descriptor array with the second hardware accelerator to determine when the second hardware accelerator may execute to consume input data from the plurality of shared buffers, and comparing an index for a last valid output entry of the output buffer descriptor array to an index for a last consumed output response entry of the output buffer response descriptor array with the first hardware accelerator to determine when the first hardware accelerator may execute to generate output data into the plurality of shared buffers. The second hardware accelerator may perform the comparing and the first hardware accelerator may perform the comparing without involvement from the hardware processor. The method may further include allocating the plurality of shared buffers, and loading the entries in the input buffer descriptor array for each respective shared buffer. The method may further include loading the entries in the output buffer descriptor array for each respective shared buffer. The method may further include loading the plurality of shared buffers with the output data and loading the corresponding response entries in the output buffer response descriptor array for each respective shared buffer consumed. The method may further include loading the corresponding response entries in the input buffer response descriptor array for each respective shared buffer consumed. The method may further include providing the entries in the input buffer descriptor array that each include a size of the input data stored in the respective shared buffer, the corresponding response entries in the input buffer response descriptor array that each include a size of the input data remaining in the respective shared buffer, the entries in the output buffer descriptor array that each include a size of the respective shared buffer available to store output data, and the corresponding response entries in the output buffer response descriptor array that each include a size of the output data stored in the respective shared buffer.

In yet another embodiment, a system includes a hardware processor to execute a thread and offload an operation; and a first hardware accelerator and a second hardware accelerator to execute the operation to generate output data and consume input data, wherein the first hardware accelerator and the second hardware accelerator are coupled to a plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer. The second hardware accelerator may compare an index for a last valid input entry of the input buffer descriptor array to an index for a last consumed input response entry of the input buffer response descriptor array to determine when the second hardware accelerator may execute to consume input data from the plurality of shared buffers, and the first hardware accelerator may compare an index for a last valid output entry of the output buffer descriptor array to an index for a last consumed output response entry of the output buffer response descriptor array to determine when the first hardware accelerator may execute to generate output data into the plurality of shared buffers. The second hardware accelerator may perform the compare and the first hardware accelerator may perform the compare without involvement from the hardware processor. The hardware processor may allocate the plurality of shared buffers, and load the entries in the input buffer descriptor array for each respective shared buffer. The hardware processor may load the entries in the output buffer descriptor array for each respective shared buffer. The first hardware accelerator may load the plurality of shared buffers with the output data and load the corresponding response entries in the output buffer response descriptor array for each respective shared buffer consumed. The second hardware accelerator may load the corresponding response entries in the input buffer response descriptor array for each respective shared buffer consumed. The entries in the input buffer descriptor array may each include a size of the input data stored in the respective shared buffer, the corresponding response entries in the input buffer response descriptor array may each include a size of the input data remaining in the respective shared buffer, the entries in the output buffer descriptor array may each include a size of the respective shared buffer available to store output data, and the corresponding response entries in the output buffer response descriptor array may each include a size of the output data stored in the respective shared buffer.

In another embodiment, a hardware processor includes means to execute a thread and offload an operation; and a first means and a second means to execute the operation to generate output data and consume input data, wherein the first means and the second means are coupled to a plurality of shared buffers to store the output data from the first means and provide the output data as the input data to the second means, an input buffer descriptor array of the second means with an entry for each respective shared buffer, an input buffer response descriptor array of the second means with a corresponding response entry for each respective shared buffer, an output buffer descriptor array of the first means with an entry for each respective shared buffer, and an output buffer response descriptor array of the first means with a corresponding response entry for each respective shared buffer.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An operation may be performed on a stream of input data. A stream of data may be provided in blocks of smaller (e.g., different) sizes than the entire block, e.g., with the smaller blocks provided until the operation is performed on the entire block. A stream of data may have each subset of data (e.g., in its respective buffer) thereof being submitted (e.g., operated on) in its original order (e.g., to an accelerator), for example, to be compressed or decompressed in a stateful manner. For example, all the utilized buffers may cumulatively store one entire block (e.g., file) of (e.g., continuous) data, for example, to be compressed or decompressed. A stateless stream of data may have each subset of data (e.g., in its respective buffer) thereof being submitted (e.g., operated on) in any (e.g., non-original) order (e.g., to an accelerator), for example, with each subset of data being independent from the other subsets of data (e.g., blocks). In one embodiment, each subset (e.g., block) of a stateless stream of data is compressed independently of any other subset (e.g., block) of the data, for example, such that no state is maintained between the subsets (e.g., blocks) and the data stream may therefore be referred to as stateless. For example, a data stream may be stateless when each subset of data (e.g., a sliding (e.g., 32 kilobyte (KB)) window) may be completely maintained within the subset (e.g., block) currently being operated on (e.g., compressed) and may not reference any other subsets (e.g., blocks). For example, each subset of data (e.g., block) of a stateless stream of data may be compressed or decompressed as its own independent job.

Stateful compression and stateful decompression may be referred to as stateful because of a sliding window of (e.g., backward) references (e.g., string references), for example, in the original order of the data. In one stateful operation, a sliding window may reference data in any previous data within a certain range (e.g., 32 KB or 64 KB) of the current data being compressed or decompressed. For example, in the DEFLATE algorithm, the window size may be 32 KB. The window size may be selected as desired, e.g., it may vary for other algorithms. In one embodiment, a stateful operation submitted to an accelerator (e.g., offload device) is executed in order and has access to a previous window (e.g., 32 KB) of data (e.g., to compress or decompress) at a given point, for example, even if that (e.g., 32 KB) window is in a previously submitted (e.g., separate) buffer. In one embodiment, when an accelerator is to stop (e.g., before completion) processing on a data set (e.g., a context), it may save the (e.g., 32 KB) window, for example, so the previous window's data may be reloaded into the accelerator when it starts processing that data set (e.g., context) again.

In one embodiment, a (e.g., compression) algorithm is to work on a (e.g., greater than 128 KB) data set that is to be broken into a plurality of smaller subsets of data (e.g., 32 KB or 64 KB (e.g., mallocs)). A processing device (e.g., a processor) may call a (e.g., compression or decompression) function multiple times, e.g., once for each subset of data. The processing device (e.g., software running thereon) may also allocate (e.g., provide) an input buffer and/or output buffer to hold the (e.g., source and/or output compressed or decompressed) data for each call. In certain embodiments, compression and/or decompression is data dependent, and thus the output size of the compressed or decompressed data is not known (e.g., a priori or during allocation of buffers). In one embodiment of compression, for any uncompressible content, the size of the output data may be larger than the input data. One solution may be to size the output buffer as a multiple of (e.g., two to 20 times) the size of the input buffer. However, this may be wasteful memory consumption in some embodiments, for example, where the compression operation compresses the size of the output data (e.g., file) to less than (e.g., 40% of) the size of the input data (e.g., file). Another solution may be to size a (e.g., input and/or output buffer) at about the expected size of the resultant of the (e.g., compression or decompression) operation, but then handle any situation where the data does not properly fit in an output buffer and/or all of the data is not consumed (e.g., operated on) from the input buffer.

In one embodiment, a processing device (e.g., the software running thereon) may call a compression and/or decompression function to operate with an input buffer and output buffer (e.g., and a pointer to a state region) and then check the result to see if the output was filled and/or the input was fully consumed. In one embodiment, based on this, a new input and/or output buffer may be allocated and a subsequent function call may be made, for example, with the updated state from the previous call. However, in certain embodiments, this method of blocking calls may be undesirable (e.g., lead to sub-optimal performance) when the compression and/or decompression is done via a hardware (e.g., compression and/or decompression) accelerator (e.g., acceleration engine).

In one embodiment, there may be a latency of submission of a request to an acceleration engine and the response back. For example, during this latency time, a (e.g., software) thread may be blocked and/or idle (for example, negatively affecting the power and/or processing resource utilization) due to the serialized nature of processing, and/or may have that thread's context swapped out (for example, adding overhead to move the (e.g., processing resource (e.g., CPU) context with each compress or decompress call)). Certain embodiments of a serial submission model may also be problematic on the accelerator, for example, when the compression (or decompression) algorithm includes state (for example, an amount greater than 100 KB, e.g., depending on the type of algorithm) to move in and/or out (e.g., of the accelerator) with each call (e.g., where the call provides 32 KB or 64 KB of new data). This may add a (e.g., undesirable) performance overhead and/or cause a critical bandwidth crunch at the accelerator attach-point (e.g., such that an accelerator may not implement stateful compression and/or decompression for an algorithm at a rate greater than 100 Gbits/second). Another alternative may be to keep the (e.g., hardware) accelerator locked and not move the state in or out, but this may lead to a less efficient (e.g., undesirable) utilization of the (e.g., hardware) accelerator, for example, due to the next call (which is to be made after the completion of the previous call) may include waking up the (e.g., software) thread, allocating a new input and/or output buffer, and sending in a new request which then may be idled while it moves up to the head of some queue to be serviced, e.g., during which time(s) the accelerator is idle.

In one embodiment, a serialized and blocking scheme may submit a call(s) (e.g., from software) to an accelerator to execute a (e.g., compression and/or decompression) thread (e.g., operation or function). An accelerator may operate on data until either an input buffer is emptied or an output buffer is filled (e.g., with the input and output data buffers returned for reuse (e.g., by a device) when each request completes). However, in one embodiment, if an output buffer fills and input remains, left-over input is to be resubmitted for operation on, e.g., a back to back submission of new data may not be performed.

Certain embodiments herein provide for a novel techniques to improve the interaction between hardware accelerators, for example, for improved performance. In one embodiment, a call for an operation (e.g., to perform compression and/or decompression) by an accelerator is not considered a mere request to the accelerator to perform the operation. Instead in this embodiment, an initial request may set up the context for the operation (e.g., the compression and/or decompression job). The input buffers may be submitted to a per-context queue of buffers. The output buffers may be submitted to a per-context queue of buffers. In one embodiment, there is no (e.g., strict) correlation between the input and output buffers. So for example, an accelerator may consume less than all (e.g., half) of the data in a first input buffer and find that a first output buffer is full of output data. The accelerator in this example may then start to use a second output buffer in the queue of buffers (for example, while signaling the (e.g., software) thread that an output buffer is now available) and may then finish consuming (e.g., processing) the data in the first input buffer. In one embodiment, the accelerator proceeds to (e.g., seamlessly) working on the input data from a second input buffer (for example, while signaling the (e.g., software) thread that another input buffer was consumed) which may generate (e.g., produce) data that is sent for storage in the second output buffer (e.g., and a third output buffer and so on if necessary). In certain embodiments herein, the responses back from the accelerator are thus not tied to the notion of a compression or decompression call, but rather to the operation(s) on any (e.g., input or output) buffer being done (e.g., the data in an input buffer being fully consumed or a new output buffer being available for use). Certain embodiments herein allow for the (e.g., software to) providing of a plurality (e.g., 2, 3, 4, 5, 6, 7, 8, 9, 10, etc.) of input and output buffers, and then waiting for the done responses to see if and/or how many more (e.g., input or output) buffers to provide. In one embodiment, this may happen independently and in parallel with the accelerator running. In one embodiment, as long as the system (e.g., software) may provide (e.g., an input or output) buffers at or about at the average consumption rate of (e.g., an input or output) buffers, there may be no (e.g., strict) serialization and/or latency between the system (e.g., software) and accelerator. This embodiment may lead to better latency and throughput, but also may avoid state save and/or restore on the accelerator.

In certain embodiments, a processing device (e.g., processor or core thereof) may offload an operation (e.g., thread) to a hardware accelerator (e.g., an accelerator circuit). In one embodiment, a hardware accelerator is coupled to an input and output buffer, e.g., to receive a stateful or stateless stream of input data to operate on to produce output data. A hardware accelerator may be coupled to one or more of: a plurality of input storage (e.g., buffers) to store the input data, a plurality of output storage (e.g., buffers) to store the output data, an input buffer descriptor storage (e.g., array) with an entry for each respective input buffer, an input buffer response descriptor storage (e.g., array) with a corresponding response entry for each respective input buffer, an output buffer descriptor storage (e.g., array) with an entry for each respective output buffer, and an output buffer response descriptor storage (e.g., array) with a corresponding response entry for each respective output buffer. An input and/or output buffer descriptor entry may include a pointer to a buffer, a size of the data in the buffer, a buffer flag, or any combination thereof. An input and/or output return buffer descriptor entry may include a size of the data in the buffer (e.g., the size of the data remaining in an input buffer and/or the size of the unused portion of an output buffer), a buffer flag, or both (e.g., but without a pointer). The term size of the data may refer to the total size of the data, for example, not the size of each element of multiple elements of data.

Although this disclosure includes embodiments in the context of compression and compression algorithms, the disclosure may be extended to other domains. Certain embodiments herein may enable back-to-back calls to (e.g., execute a thread on) an accelerator for a stateful/stateless stream of data, for example, without allocating a worst-case size of data buffers for the input and/or output streams and/or with allowing the accelerator to be efficiently (e.g., highly) utilized.

Certain embodiments herein provide for input and output buffer submission and/or responses to be asynchronous. Certain embodiments herein may include one or more of the following: buffers are passed to an accelerator, an accelerator may have exclusive ownership of those buffers until explicitly returned (or shared ownership with another accelerator), buffer return may not be tied to request completion (e.g., completion of a thread sent to the accelerator for execution), an accelerator may cease operation on a (e.g., current) context when out of either input or output buffer space (e.g., but does not cease operation on (e.g., return) buffers that have valid input remaining), allow continuing operation on a current context if new buffer(s) arrive in time, and decoupling input and output buffers from each other and from the request submission model. Certain embodiments herein may improve accelerator performance, reduce latency, and positively impact system performance. Certain embodiments herein may reduce save and/or restore bandwidth (e.g., and the associated performance overheads), for example, in the compression and/or decompression of a stateful or stateless stream of input data. Certain embodiments herein may include an accelerator to implement stateful or stateless compression and/or decompression for an algorithm at a rate greater than 100 Gbits/second (e.g., at a rate of about 200-400 Gbits/second).

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
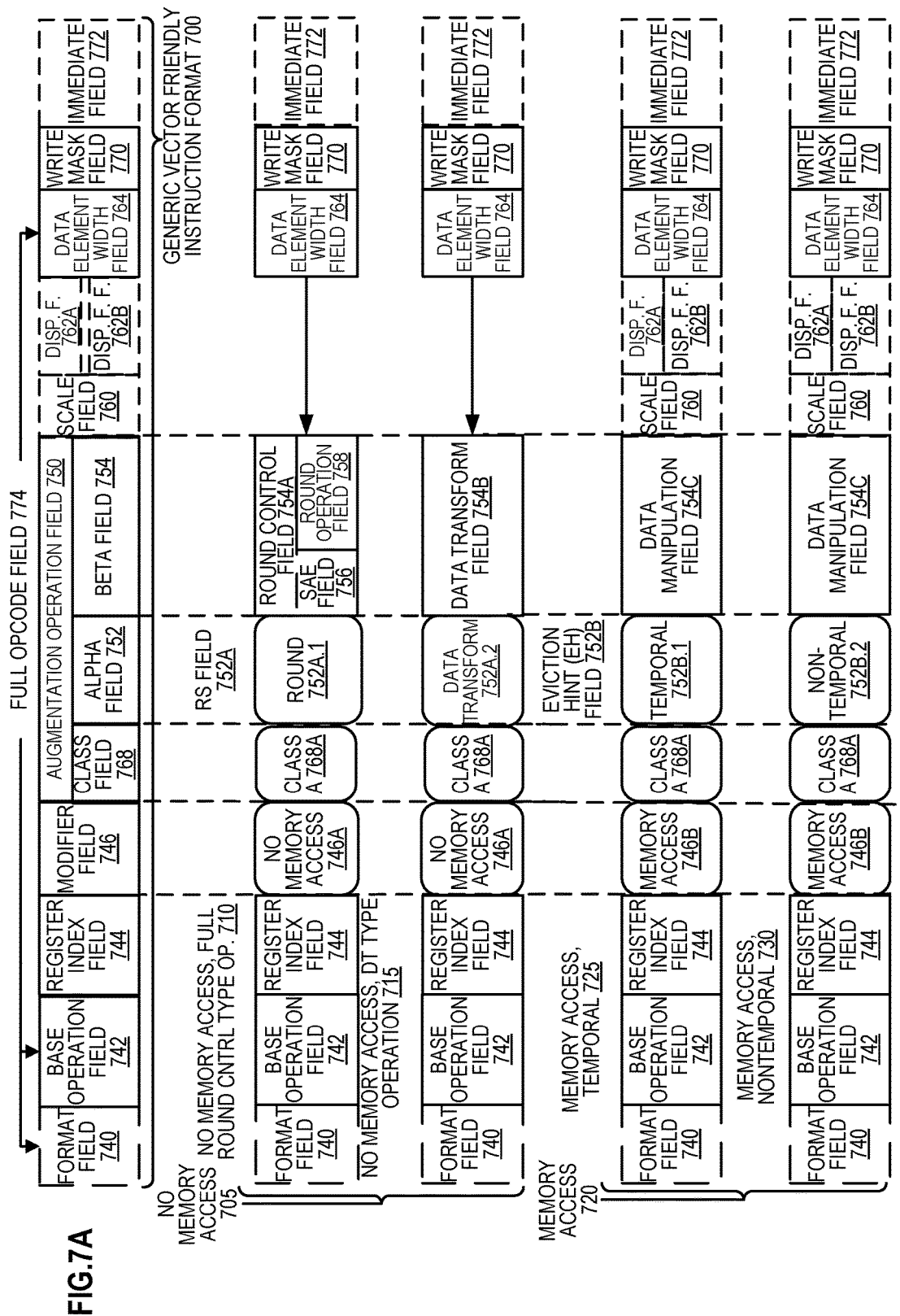
FIG. 7A is a block diagram illustrating a generic vector friendly instruction format and class A instruction templates thereof according to embodiments of the disclosure.
Figure 7B:
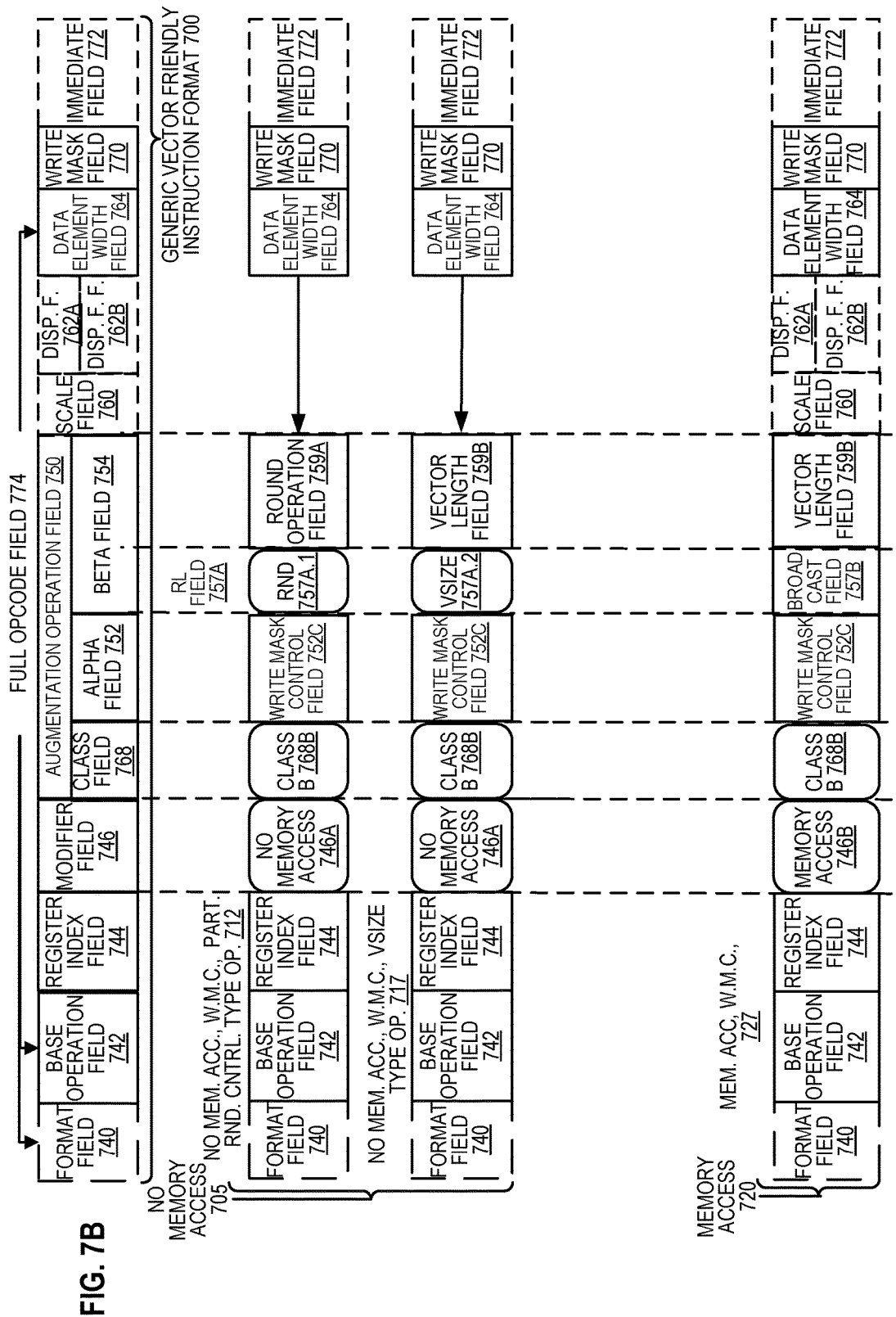
FIG. 7B is a block diagram illustrating the generic vector friendly instruction format and class B instruction templates thereof according to embodiments of the disclosure.

FIGS. 7A-7B are block diagrams illustrating a generic vector friendly instruction format and instruction templates thereof according to embodiments of the disclosure. FIG. 7A is a block diagram illustrating a generic vector friendly instruction format and class A instruction templates thereof according to embodiments of the disclosure; while FIG. 7B is a block diagram illustrating the generic vector friendly instruction format and class B instruction templates thereof according to embodiments of the disclosure. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the disclosure, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*index+base$).

Displacement Field 762A—its content is used as part of memory address generation (e.g., for address generation that uses $2^{scale}*index+base+displacement$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the disclosure are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the disclosure the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the disclosure where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the disclosure where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to embodiments of the disclosure. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the disclosure are described with reference to the specific vector friendly instruction format 800 in the context of the generic vector friendly instruction format 700 for illustrative purposes, the disclosure is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the disclosure is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the disclosure).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]—R), EVEX.X bit field (EVEX byte 1, bit [6]—X), and 757BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]—U)—If EVEX.U=0, it indicates class A or EVEX.U0; if EVEX.U=1, it indicates class B or EVEX.U1.

Prefix encoding field 825 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8;

when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the disclosure. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the disclosure. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
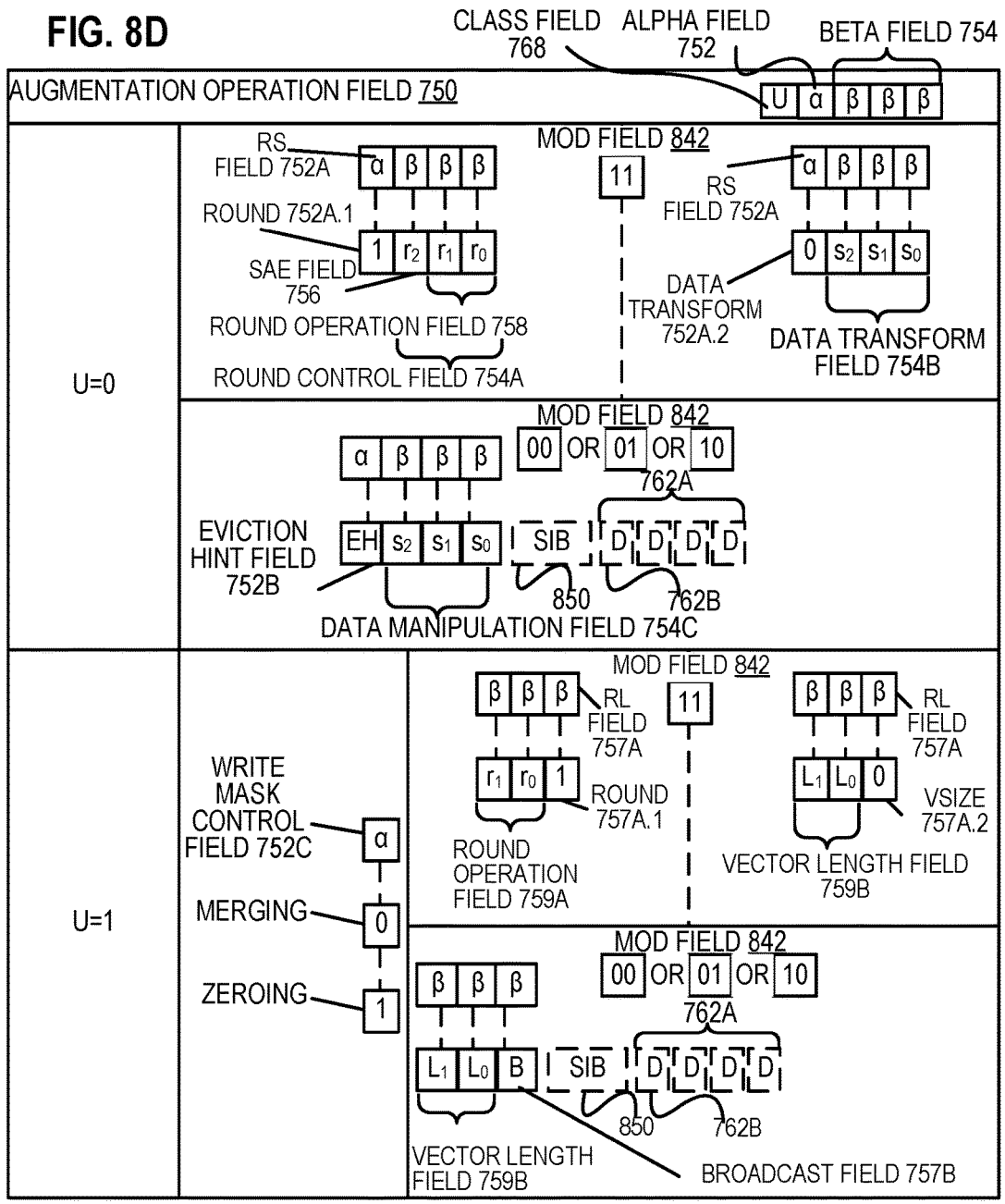
FIG. 8D is a block diagram illustrating the fields of the specific vector friendly instruction format in FIG. 8A that make up the augmentation operation field 750 according to one embodiment of the disclosure.

FIG. 8D is a block diagram illustrating the fields of the specific vector friendly instruction format 800 that make up the augmentation operation field 750 according to one embodiment of the disclosure. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A. When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B. When U=0 and the MOD field 842 contains 00, 01, or 10 (signifying a memory access operation), the alpha field 752 (EVEX byte 3, bit [7]—EH) is interpreted as the eviction hint (EH) field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—$S_0$) is interpreted as the RL field 757A; when it contains a 1 (round 757A.1) the rest of the beta field 754 (EVEX byte 3, bit [6-5]—$S_{2-1}$) is interpreted as the round operation field 759A, while when the RL field 757A contains a 0 (VSIZE 757.A2) the rest of the beta field 754 (EVEX byte 3, bit [6-5]—$S_{2-1}$) is interpreted as the vector length field 759B (EVEX byte 3, bit [6-5]—$L_{1-0}$). When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—$L_{1-0}$) and the broadcast field 757B (EVEX byte 3, bit [4]—B).

Exemplary Register Architecture

Figure 9:
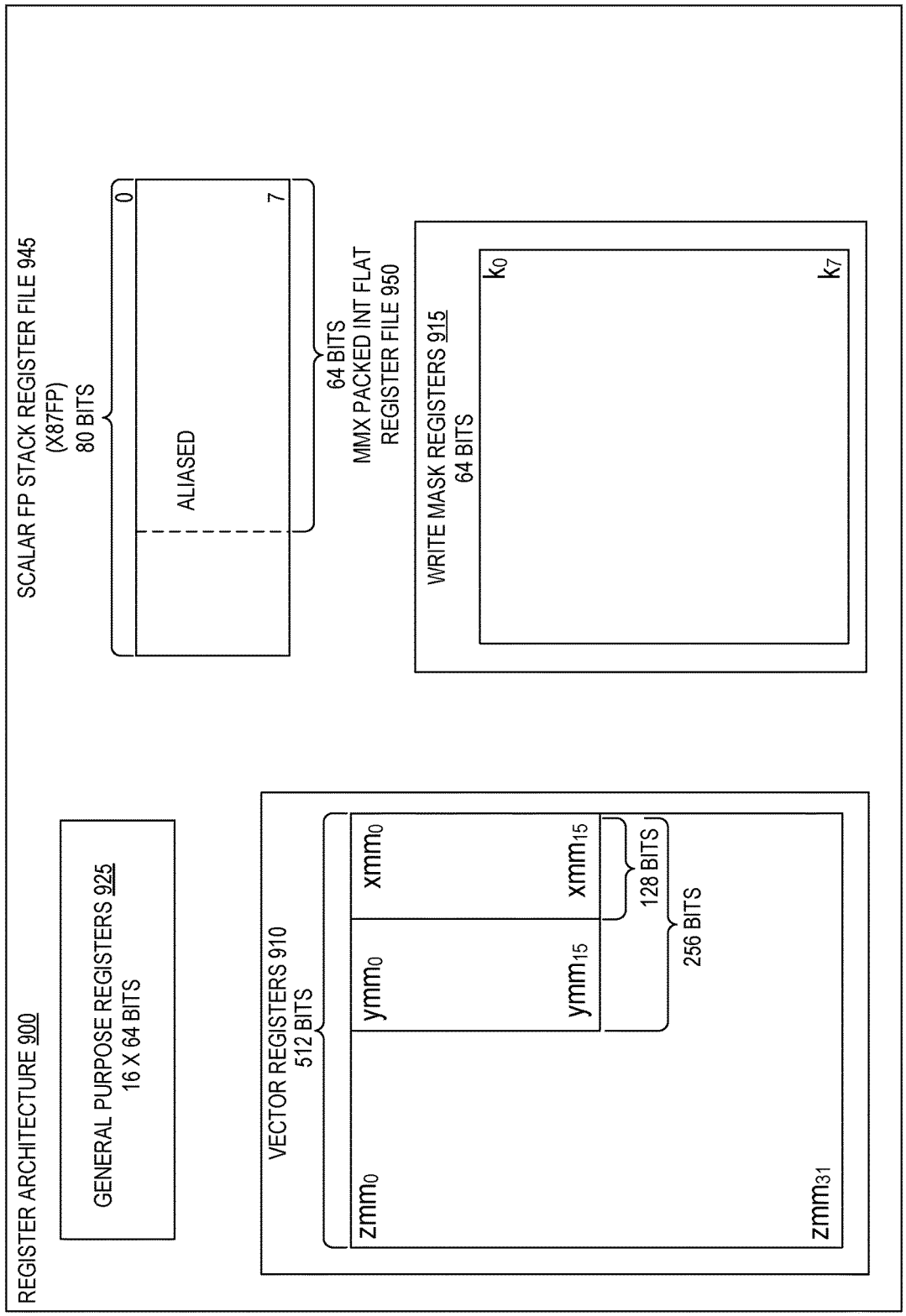
FIG. 9 is a block diagram of a register architecture according to one embodiment of the disclosure

FIG. 9 is a block diagram of a register architecture 900 according to one embodiment of the disclosure. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
| --- | --- | --- | --- |
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the disclosure. FIG. 10B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macro-instructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
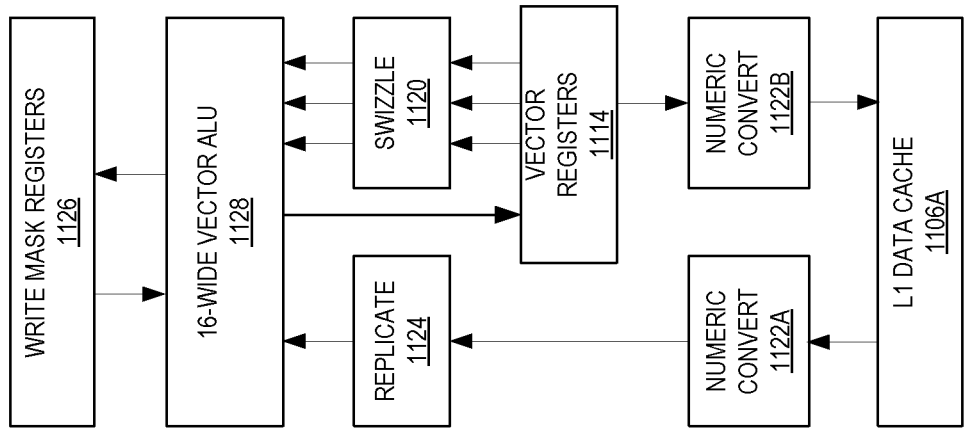
FIG. 11B is an expanded view of part of the processor core in FIG. 11A according to embodiments of the disclosure.
Figure 11A:
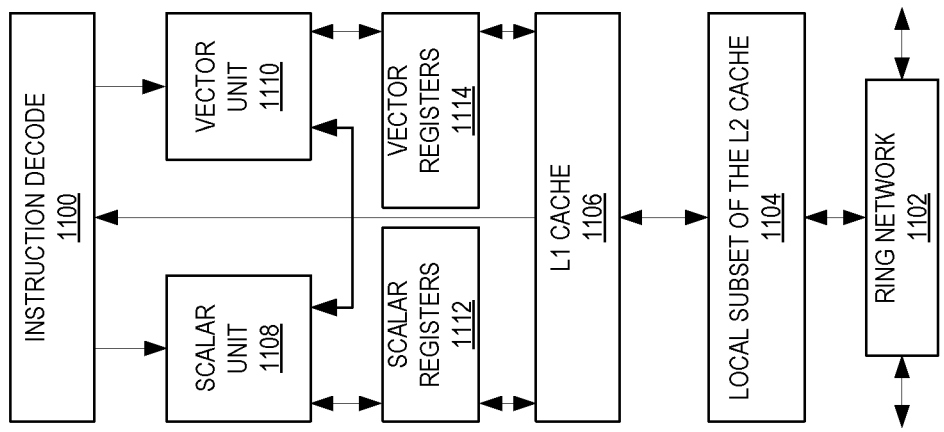
FIG. 11A is a block diagram of a single processor core, along with its connection to the on-die interconnect network and with its local subset of the Level 2 (L2) cache, according to embodiments of the disclosure.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the disclosure. In one embodiment, an instruction decode unit 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the disclosure may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the disclosure. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
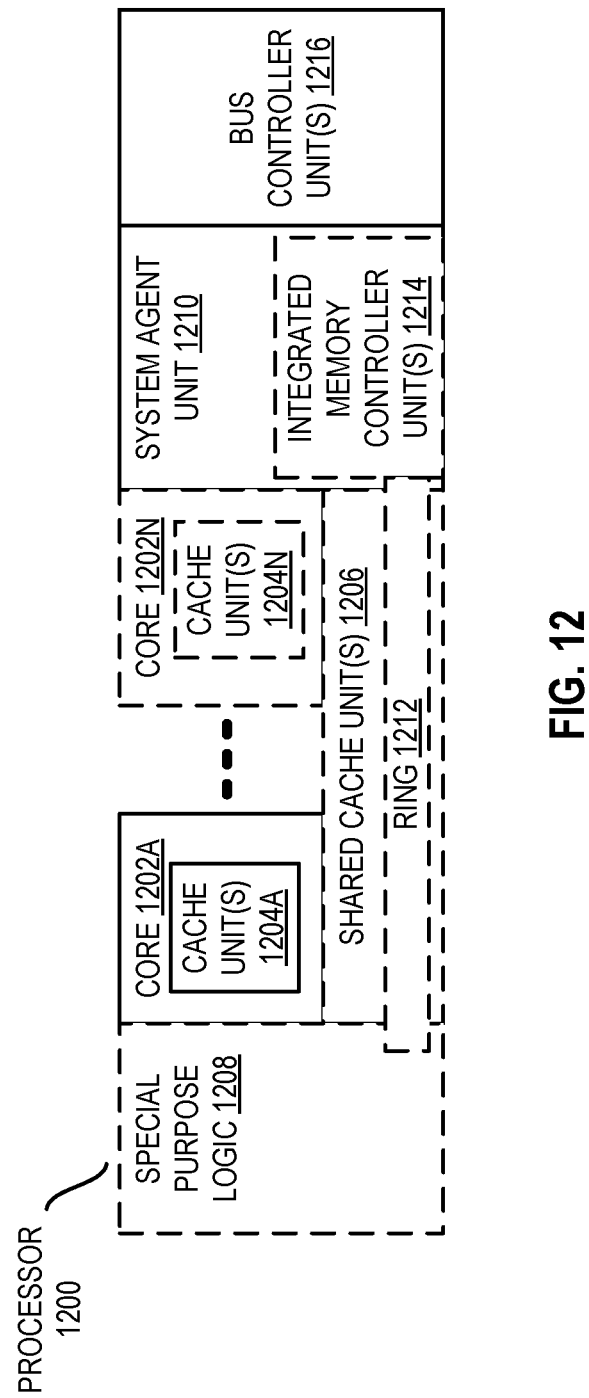
FIG. 12 is a block diagram of a processor that may have more than one core, may have an integrated memory controller, and may have integrated graphics according to embodiments of the disclosure.

FIG. 12 is a block diagram of a processor 1200 that may have more than one core, may have an integrated memory controller, and may have integrated graphics according to embodiments of the disclosure. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
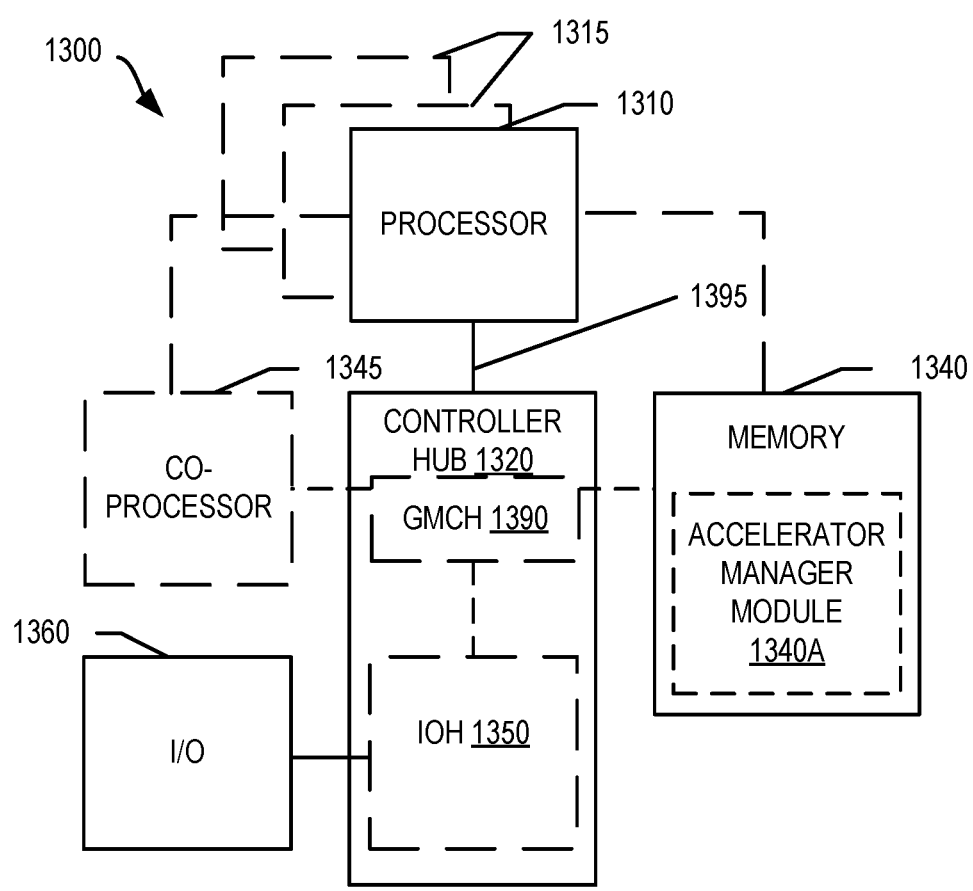
FIG. 13 is a block diagram of a system in accordance with one embodiment of the present disclosure.

Referring now to FIG. 13, shown is a block diagram of a system 1300 in accordance with one embodiment of the present disclosure. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350. Memory 1340 may include an accelerator manager module 1340A, for example, to store code that when executed causes a processor to perform any method of this disclosure.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
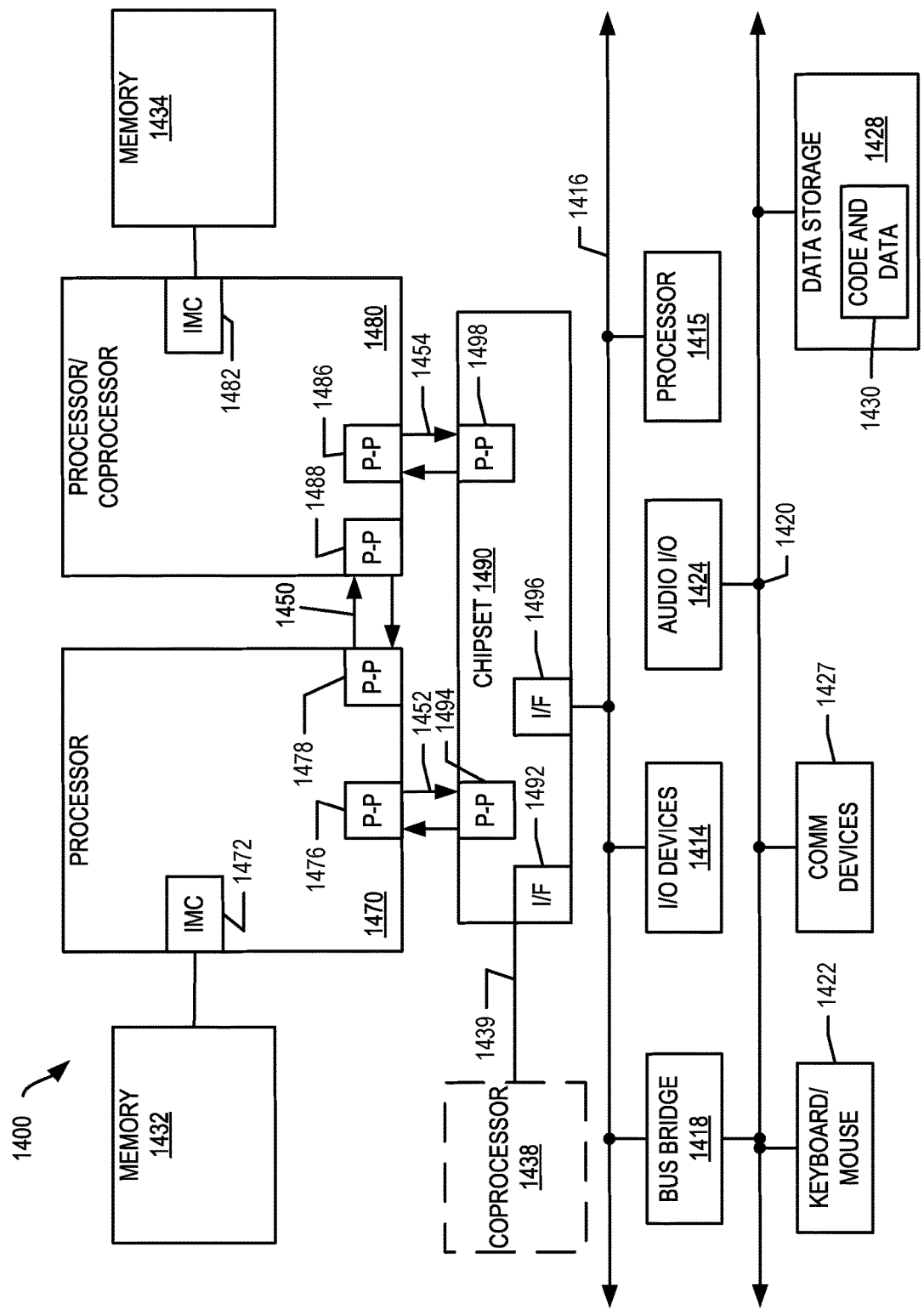
FIG. 14 is a block diagram of a more specific exemplary system in accordance with an embodiment of the present disclosure.

Referring now to FIG. 14, shown is a block diagram of a first more specific exemplary system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the disclosure, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
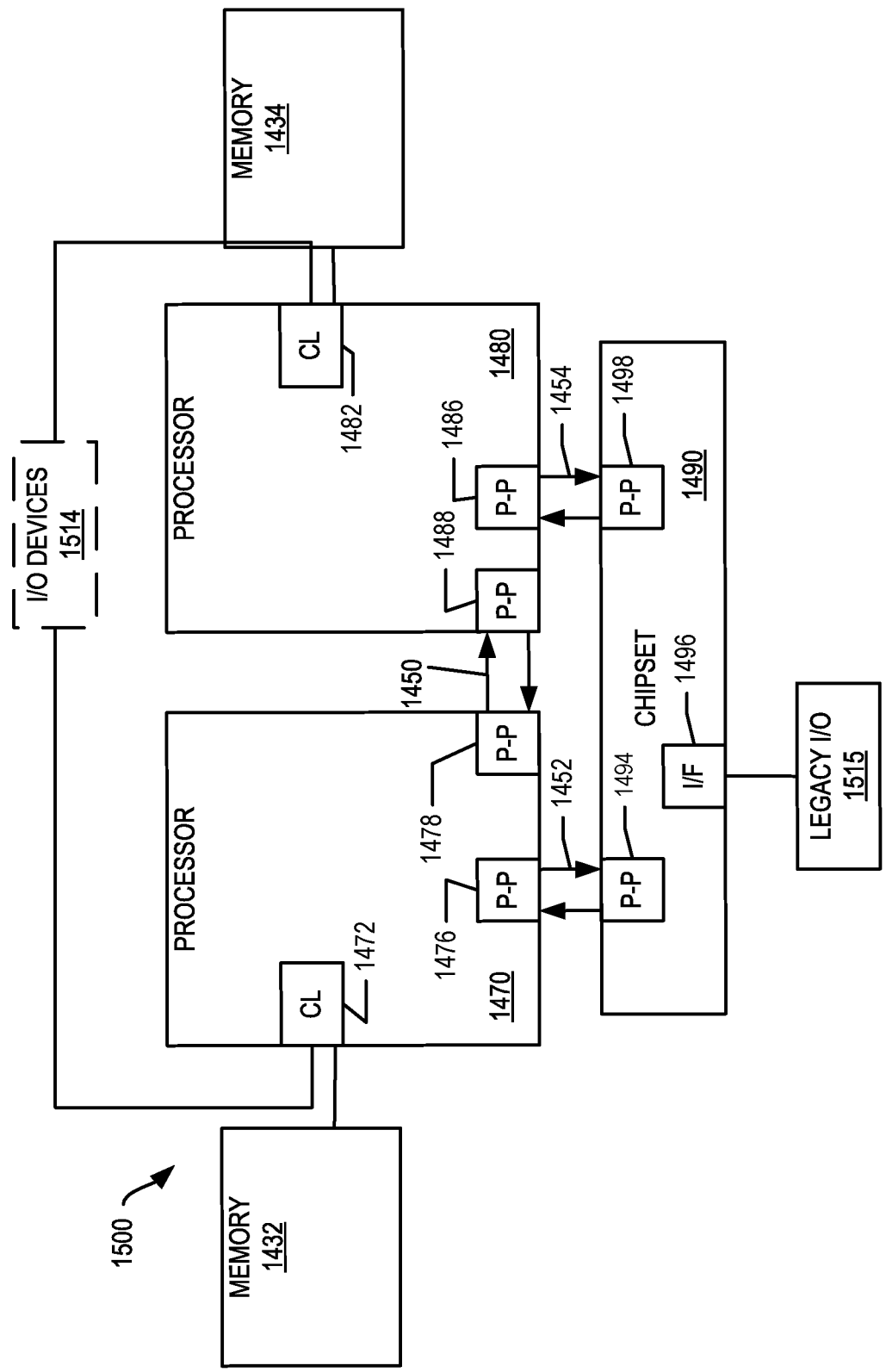
FIG. 15, shown is a block diagram of a second more specific exemplary system in accordance with an embodiment of the present disclosure.

Referring now to FIG. 15, shown is a block diagram of a second more specific exemplary system 1500 in accordance with an embodiment of the present disclosure Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
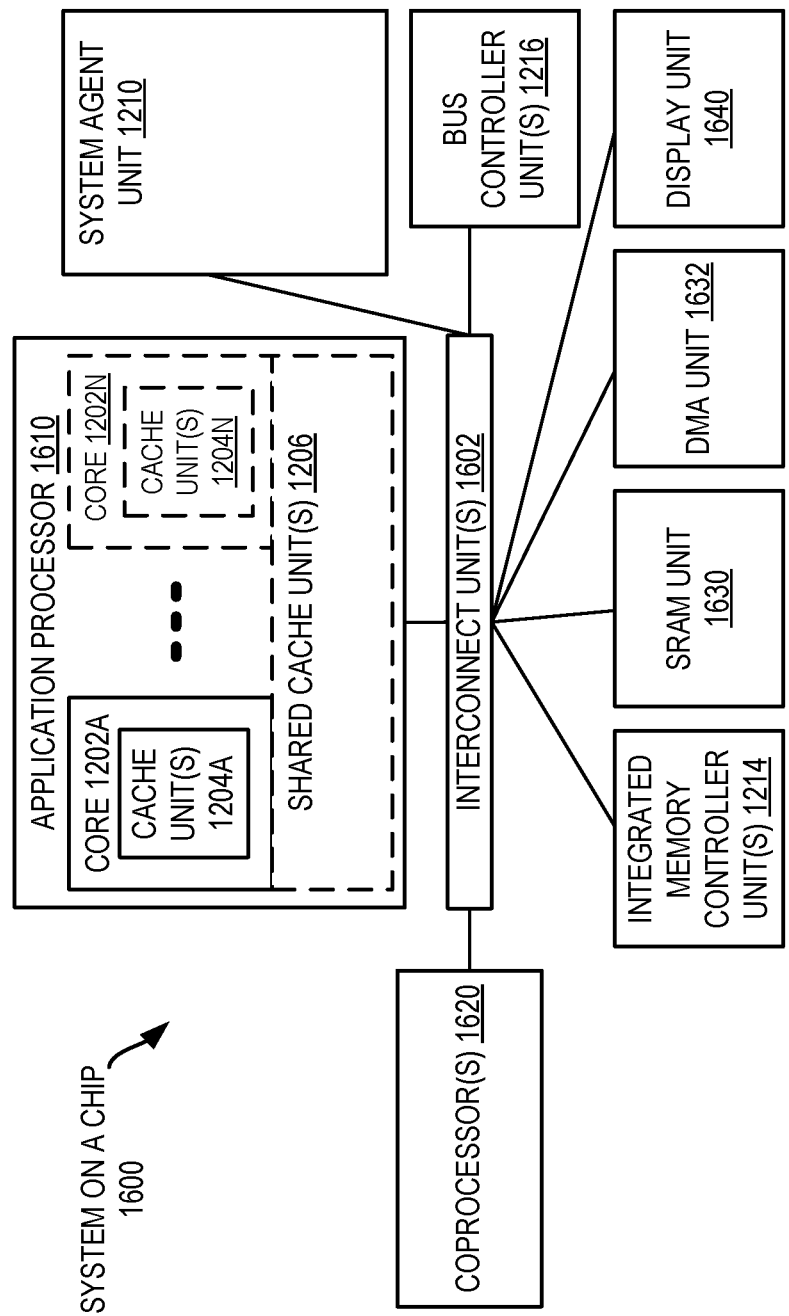
FIG. 16, shown is a block diagram of a system on a chip (SoC) in accordance with an embodiment of the present disclosure.

Referring now to FIG. 16, shown is a block diagram of a SoC 1600 in accordance with an embodiment of the present disclosure. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
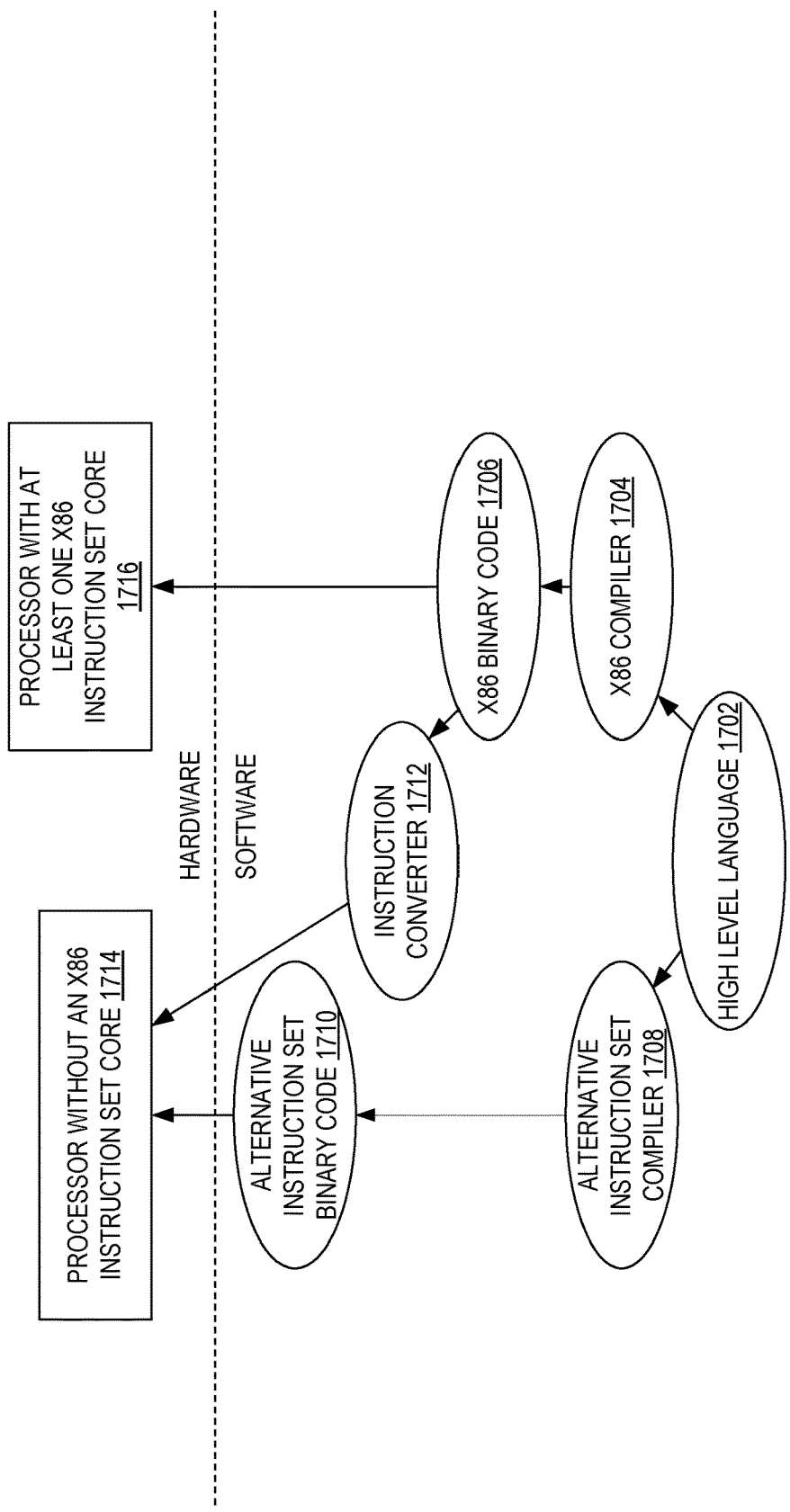
FIG. 17 is a block diagram contrasting the use of a software instruction converter to convert binary instructions in a source instruction set to binary instructions in a target instruction set according to embodiments of the disclosure.

FIG. 17 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

What is claimed is:

1. A hardware processor comprising:
a core to execute a thread and offload an operation;
a plurality of shared buffers; and
a first hardware accelerator and a second hardware accelerator to execute the operation to generate output data and consume input data, wherein the first hardware accelerator and the second hardware accelerator are coupled to the plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer, wherein the second hardware accelerator is to compare a pointer for a last valid input entry of the input buffer descriptor array to a pointer for a last consumed input response entry of the input buffer response descriptor array to determine when the second hardware accelerator is to execute to consume the input data from the plurality of shared buffers, and the first hardware accelerator is to compare a pointer for a last valid output entry of the output buffer descriptor array to a pointer for a last consumed output response entry of the output buffer response descriptor array to determine when the first hardware accelerator is to execute to generate the output data into the plurality of shared buffers.

2. The hardware processor of claim 1, wherein the second hardware accelerator is to perform the compare and the first hardware accelerator is to perform the compare without involvement from the core.

3. The hardware processor of claim 1, wherein the core is to allocate the plurality of shared buffers, and load the entries in the input buffer descriptor array for each respective shared buffer.

4. The hardware processor of claim 3, wherein the core is to load the entries in the output buffer descriptor array for each respective shared buffer.

5. The hardware processor of claim 1, wherein the first hardware accelerator is to load the plurality of shared buffers with the output data and load the corresponding response entries in the output buffer response descriptor array for each respective shared buffer consumed.

6. The hardware processor of claim 5, wherein the second hardware accelerator is to load the corresponding response entries in the input buffer response descriptor array for each respective shared buffer consumed.

7. The hardware processor of claim 1, wherein the entries in the input buffer descriptor array each include a size of the input data stored in the respective shared buffer, the corresponding response entries in the input buffer response descriptor array each include a size of the input data remaining in the respective shared buffer, the entries in the output buffer descriptor array each include a size of the respective shared buffer available to store output data, and the corresponding response entries in the output buffer response descriptor array each include a size of the output data stored in the respective shared buffer.

8. A method comprising:
offloading an operation from a hardware processor to a first hardware accelerator;
executing the operation on the first hardware accelerator and a second hardware accelerator to generate output data and consume input data, wherein the first hardware accelerator and the second hardware accelerator are coupled to a plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer;
comparing a pointer for a last valid input entry of the input buffer descriptor array to a pointer for a last consumed input response entry of the input buffer response descriptor array with the second hardware accelerator to determine when the second hardware accelerator is to execute to consume the input data from the plurality of shared buffers; and
comparing a pointer for a last valid output entry of the output buffer descriptor array to a pointer for a last consumed output response entry of the output buffer response descriptor array with the first hardware accelerator to determine when the first hardware accelerator is to execute to generate the output data into the plurality of shared buffers.

9. The method of claim 8, wherein the second hardware accelerator performs the comparing and the first hardware accelerator performs the comparing without involvement from the hardware processor.

10. The method of claim 8, further comprising allocating the plurality of shared buffers, and loading the entries in the input buffer descriptor array for each respective shared buffer.

11. The method of claim 10, further comprising loading the entries in the output buffer descriptor array for each respective shared buffer.

12. The method of claim 8, further comprising loading the plurality of shared buffers with the output data and loading the corresponding response entries in the output buffer response descriptor array for each respective shared buffer consumed.

13. The method of claim 12, further comprising loading the corresponding response entries in the input buffer response descriptor array for each respective shared buffer consumed.

14. The method of claim 8, further comprising providing the entries in the input buffer descriptor array that each include a size of the input data stored in the respective shared buffer, the corresponding response entries in the input buffer response descriptor array that each include a size of the input data remaining in the respective shared buffer, the entries in the output buffer descriptor array that each include a size of the respective shared buffer available to store output data, and the corresponding response entries in the output buffer response descriptor array that each include a size of the output data stored in the respective shared buffer.

15. A system comprising:
a hardware processor to execute a thread and offload an operation;
a plurality of shared buffers; and
a first hardware accelerator and a second hardware accelerator to execute the operation to generate output data and consume input data, wherein the first hardware accelerator and the second hardware accelerator are coupled to the plurality of shared buffers to store the output data from the first hardware accelerator and provide the output data as the input data to the second hardware accelerator, an input buffer descriptor array of the second hardware accelerator with an entry for each respective shared buffer, an input buffer response descriptor array of the second hardware accelerator with a corresponding response entry for each respective shared buffer, an output buffer descriptor array of the first hardware accelerator with an entry for each respective shared buffer, and an output buffer response descriptor array of the first hardware accelerator with a corresponding response entry for each respective shared buffer, wherein the second hardware accelerator is to compare a pointer for a last valid input entry of the input buffer descriptor array to a pointer for a last consumed input response entry of the input buffer response descriptor array to determine when the second hardware accelerator is to execute to consume the input data from the plurality of shared buffers, and the first hardware accelerator is to compare a pointer for a last valid output entry of the output buffer descriptor array to a pointer for a last consumed output response entry of the output buffer response descriptor array to determine when the first hardware accelerator is to execute to generate the output data into the plurality of shared buffers.

16. The system of claim 15, wherein the second hardware accelerator is to perform the compare and the first hardware accelerator is to perform the compare without involvement from the hardware processor.

17. The system of claim 15, wherein the hardware processor is to allocate the plurality of shared buffers, and load the entries in the input buffer descriptor array for each respective shared buffer.

18. The system of claim 17, wherein the hardware processor is to load the entries in the output buffer descriptor array for each respective shared buffer.

19. The system of claim 15, wherein the first hardware accelerator is to load the plurality of shared buffers with the output data and load the corresponding response entries in the output buffer response descriptor array for each respective shared buffer consumed.

20. The system of claim 19, wherein the second hardware accelerator is to load the corresponding response entries in the input buffer response descriptor array for each respective shared buffer consumed.

21. The system of claim 15, wherein the entries in the input buffer descriptor array each include a size of the input data stored in the respective shared buffer, the corresponding response entries in the input buffer response descriptor array each include a size of the input data remaining in the respective shared buffer, the entries in the output buffer descriptor array each include a size of the respective shared buffer available to store output data, and the corresponding response entries in the output buffer response descriptor array each include a size of the output data stored in the respective shared buffer.

* * * * *